United States Patent
Song et al.

(10) Patent No.: US 12,015,282 B2
(45) Date of Patent: Jun. 18, 2024

(54) WIRELESS POWER TRANSMITTING DEVICE FOR WIRELESSLY TRANSMITTING POWER, WIRELESS POWER RECEIVING DEVICE FOR WIRELESSLY RECEIVING POWER, AND OPERATION METHOD THEREOF

(71) Applicant: Samsung Electronics Co., Ltd., Gyeonggi-do (KR)

(72) Inventors: Mingi Song, Gyeonggi-do (KR); Kyungmin Park, Gyeonggi-do (KR); Changhak O, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/846,380

(22) Filed: Jun. 22, 2022

(65) Prior Publication Data

US 2023/0063671 A1    Mar. 2, 2023

Related U.S. Application Data

(63) Continuation of application No. PCT/KR2022/007740, filed on May 31, 2022.

(30) Foreign Application Priority Data

Aug. 30, 2021    (KR) ......................... 10-2021-0115070

(51) Int. Cl.
*H02J 50/80*    (2016.01)
*H02J 50/10*    (2016.01)

(52) U.S. Cl.
CPC .............. *H02J 50/80* (2016.02); *H02J 50/10* (2016.02)

(58) Field of Classification Search
CPC .................................. H02J 50/80; H02J 50/10
(Continued)

(56) References Cited

U.S. PATENT DOCUMENTS

| 2008/0211320 A1 | 9/2008 | Cook et al. |
| 2009/0072627 A1* | 3/2009 | Cook .................. H01Q 1/2225 307/104 |

(Continued)

FOREIGN PATENT DOCUMENTS

| KR | 10-2012-0071626 A | 7/2012 |
| KR | 10-2013-0043829 A | 5/2013 |

(Continued)

OTHER PUBLICATIONS

International Search Report dated Sep. 6, 2022.

*Primary Examiner* — Alfonso Perez Borroto
(74) *Attorney, Agent, or Firm* — Cha & Reiter, LLC

(57) ABSTRACT

According to an embodiment, a wireless power transmitting device may include a transmission coil, a DC/DC converter configured to output a driving voltage, an inverter configured to output AC power to the transmission coil, and a controller. The controller may be configured to output a first control signal for generating the AC power having a first frequency to the inverter, measure a demodulated voltage generated by demodulating a signal applied to the transmission coil, and output, to the inverter, a second control signal for generating the AC power having a second frequency different from the first frequency, based on a first peak-to-peak value identified in the demodulated voltage being a preset first value or more. The inverter may output the AC power having the second frequency to the transmission coil based on the second control signal. Other various embodiments are possible as well.

20 Claims, 24 Drawing Sheets

(58) Field of Classification Search
USPC .......................................................... 307/104
See application file for complete search history.

(56) References Cited

U.S. PATENT DOCUMENTS

| | | | |
|---|---|---|---|
| 2009/0079268 A1* | 3/2009 | Cook | H01Q 1/2225 |
| | | | 307/104 |
| 2009/0167449 A1* | 7/2009 | Cook | H04B 5/24 |
| | | | 331/154 |
| 2012/0161539 A1 | 6/2012 | Kim et al. | |
| 2013/0099732 A1 | 4/2013 | Lee et al. | |
| 2015/0008751 A1* | 1/2015 | Widmer | H02J 50/70 |
| | | | 307/104 |
| 2015/0171974 A1 | 6/2015 | Perry | |
| 2015/0239356 A1 | 8/2015 | Boyer et al. | |
| 2016/0181822 A1* | 6/2016 | Yang | H02J 50/80 |
| | | | 307/104 |
| 2016/0261233 A1* | 9/2016 | Pohl | H04B 5/263 |
| 2016/0336785 A1 | 11/2016 | Gao et al. | |
| 2017/0085096 A1* | 3/2017 | Hong | H02J 50/12 |
| 2017/0250574 A1 | 8/2017 | Min et al. | |
| 2018/0342908 A1 | 11/2018 | Azancot et al. | |

FOREIGN PATENT DOCUMENTS

| | | |
|---|---|---|
| KR | 10-2017-0100178 A | 9/2017 |
| KR | 10-2017-0126318 A | 11/2017 |
| KR | 10-2018-0079707 A | 7/2018 |
| KR | 10-2019-0063930 A | 6/2019 |
| KR | 10-2020-0003495 A | 1/2020 |
| KR | 10-2020-0032458 A | 3/2020 |
| KR | 10-2020-0045249 A | 5/2020 |
| KR | 10-2020-0077816 A | 7/2020 |

* cited by examiner

WIRELESS POWER TRANSMITTING DEVICE FOR WIRELESSLY TRANSMITTING POWER, WIRELESS POWER RECEIVING DEVICE FOR WIRELESSLY RECEIVING POWER, AND OPERATION METHOD THEREOF

CROSS-REFERENCE TO RELATED APPLICATION(S)

This application is a continuation of International Application No. PCT/KR2022/007740 designating the United States, filed on May 31, 2022, in the Korean Intellectual Property Receiving Office and claiming priority to Korean Patent Application No. 10-2021-0115070, filed on Aug. 30, 2021, in the Korean Intellectual Property Office, the disclosures of which are incorporated by reference herein in their entireties.

BACKGROUND

Technical Field

One or more embodiments disclosed herein generally relate to a wireless power transmitting device for wirelessly transmitting power, a wireless power receiving device for wirelessly receiving power, and an operation method thereof, e.g., a method in which the wireless power transmitting device and the wireless power receiving device communicate with each other.

Description of Related Art

Wireless power transmission technology using magnetic induction have become increasingly popular. In this technology, power may be transferred by electromagnetic field induced in a coil. A wireless power transmitting device applies a current to the transmission coil to generate an electromagnetic field, and an induced electromotive force is formed in the reception coil of a wireless power receiving device, so that power may be wirelessly transmitted between the two.

The wireless power receiving device may perform in-band communication with the wireless power transmitting device while wirelessly receiving power from the wireless power transmitting device. The wireless power receiving device may provide information to the wireless power transmitting device by performing the in-band communication. For example, the wireless power receiving device may perform in-band communication based on amplitude shift keying (ASK) modulation. To implement such communication, at least one additional element may be selectively connected to the resonance circuit of the wireless power receiving device through a switch, and the wireless power receiving device may perform modulation by controlling the on/off state of the switch. Depending on modulation by the wireless power receiving device, the amplitude of the current and/or voltage applied to the transmission coil of the wireless power transmitting device may be changed. The wireless power transmitting device may identify information provided by the wireless power receiving device by demodulating and/or decoding information transmitted using the amplitude of the current and/or voltage applied to the transmission coil.

SUMMARY

By the wireless power receiving device performing in-band communication based on the ASK modulation, the current and/or voltage applied to the transmission coil of the wireless power transmitting device may be changed as described above. Meanwhile, when the degree of change (the peak-to-peak value, which is described below) is relatively large, the degree of change in the voltage applied to at least one capacitor included in the wireless power transmitting device may also be relatively large. The change in voltage at the at least one capacitor may cause charge and discharge at the at least one capacitor. As at least one capacitor is charged and discharged, expansion and contraction of the dielectric within the at least one capacitor may occur. The expansion and contraction of the dielectric may cause vibration. The generated vibration may be transferred to the surrounding components and may be heard by the user as noise. For example, in the Qi wireless charging standard, the modulation frequency for ASK modulation may be 2 kHz. The expansion and contraction of the dielectric according to the modulation may also have a corresponding modulation frequency and may be in the audible frequency band (e.g., 2 to 20000 Hz), so that audible noise may occur. Further, the capacitor included in the wireless power receiving device may also expand and contract according to modulation, which may also be heard by the user as audible noise.

According to an embodiment, a wireless power transmitting device may comprise a transmission coil, a DC/DC converter configured to output a driving voltage, an inverter configured to output AC power to the transmission coil, using the driving voltage, and a controller. The controller may be configured to output a first control signal for generating the AC power having a first frequency to the inverter, so that the inverter outputs, to the transmission coil, the AC power having the first frequency based on the first control signal, measure a demodulated voltage generated by demodulating a signal applied to the transmission coil while the AC power having the first frequency is applied to the transmission coil, and output, to the inverter, a second control signal for generating the AC power having a second frequency different from the first frequency, instead of the first control signal, based on a first peak-to-peak value identified in the demodulated voltage being a preset first value or more. The inverter may output the AC power having the second frequency to the transmission coil based on the second control signal.

According to an embodiment, a method for operating a wireless power transmitting device including a transmission coil, a DC/DC converter configured to output a driving voltage, an inverter configured to output AC power to the transmission coil using the driving voltage, and a controller may comprise outputting, by the controller, a first control signal for generating the AC power having a first frequency to the inverter, so that the inverter outputs, to the transmission coil, the AC power having the first frequency based on the first control signal, measuring, by the controller, a demodulated voltage generated by demodulating a signal applied to the transmission coil while the AC power having the first frequency is applied to the transmission coil, and outputting, by the controller, to the inverter, a second control signal for generating the AC power having a second frequency different from the first frequency, instead of the first control signal, based on a first peak-to-peak value identified in the demodulated voltage being a preset first value or more. The inverter may output the AC power having the second frequency to the transmission coil based on the second control signal.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

According to certain embodiments, a wireless power transmitting device and an operation method thereof may change the operating frequency for power transmission when a degree of change in the voltage applied to the transmission coil according to in-band communication meets a designated condition.

According to certain embodiments, a wireless power receiving device and an operation method thereof may change its load state when a degree of change in the voltage applied to the reception coil during in-band communication meets a designated condition.

According to certain embodiments, depending on the change in the operating frequency, the degree of change in voltage may be suppressed so that the generation of audible noise may be suppressed.

According to certain embodiments, depending on the change in the state of the load, the degree of change in voltage may be suppressed so that the generation of audible noise may be suppressed.

Figure 1:
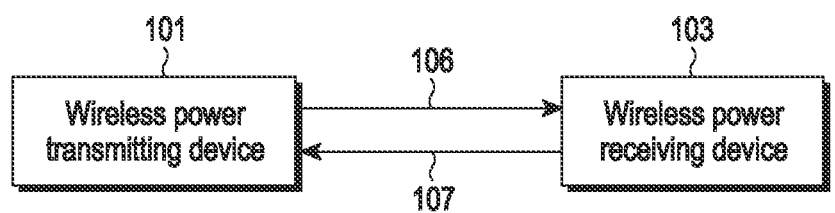
FIG. 1 is a block diagram illustrating a wireless power transmission device and a wireless power receiving device according to an embodiment.

FIG. 1 is a block diagram illustrating a wireless power transmission device and a wireless power receiving device according to an embodiment.

Referring to FIG. 1, according to an embodiment, a wireless power transmitting device 101 may wirelessly transmit power 106 to a wireless power reception device 103. At the same time, the wireless power transmitting device 101 may receive information 107 from the wireless power receiving device 103. For example, the wireless power transmission device 101 may transmit power 106 using induction. Using induction, the wireless power transmission device 101 may include at least one of, e.g., a power source, a DC-DC conversion circuit (e.g., DC/DC converter), DC-AC conversion circuit (e.g., inverter), an amplifying circuit, an impedance matching circuit, at least one capacitor, at least one coil, or a communication modulation circuit. The at least one capacitor together with the at least one coil may constitute a resonance circuit. The wireless power transmission device 101 may be implemented according to the wireless power consortium (WPC) Qi standard. The wireless power transmission device 101 may include a coil that is capable of produce a magnetic field generated by induction when an electric current flow thereacross. When the wireless power transmission device 101 produces an induced magnetic field, the wireless power transmission device 101 may wirelessly transmit the power 106. Further, an induced electromotive force (or current, voltage, and/or power) may be generated by the magnetic field generated in the coil of the wireless power receiving device 103 due to resonance or induction. The process of producing an induced electromotive force through the coil may be referred to as "the wireless power reception device 103 wirelessly receives the power 106."

According to an embodiment, the wireless power transmission device 101 may communicate with the wireless power receiving device 103. For example, the wireless power transmitting device 101 may communicate with the wireless power receiving device 103 via in-band communication. The wireless power transmitting device 101 may modulate data to be transmitted according to, e.g., frequency shift keying (FSK) modulation, and the wireless power reception device 103 may perform modulation according to amplitude shift keying (ASK) modulation, thereby providing information 107. The wireless power transmitting device 101 may identify the information 107 provided by the wireless power receiving device 103 based on the amplitude of the current and/or voltage applied to the transmission coil. In FIG. 1, the wireless power receiving device 103 is shown as directly transmitting the information 107 to the wireless power transmitting device 101, but this is merely for ease of understanding, and it will be appreciated by one of ordinary skill in the art that that the wireless power receiving device 103 only controls on/off of at least one switch therein. The operation of performing modulation based on ASK modulation and/or FSK modulation may be understood as an operation of transmitting data (or packets) using in-band communication, and the operation of performing demodulation based on the ASK demodulation and/or FSK demodulation may be understood as an operation of receiving data (or packets) using in-band communication.

In the instant disclosure, that the wireless power transmitting device 101 or the wireless power receiving device 103 performs a specific operation may mean that one or more pieces of hardware included in the wireless power transmitting device 101 or the wireless power receiving device 103, e.g., controller (e.g., micro-controlling unit (MCU), field programmable gate array (FPGA), application specific integrated circuit (ASIC), microprocessor, or application processor (AP)) performs the specific operation. Or, that the wireless power transmitting device 101 or the wireless power receiving device 103 performs a specific operation may also mean that the controller controls another hardware device to perform the specific operation. That the wireless power transmitting device 101 or the wireless power reception device 103 performs a specific operation may mean that its controller or another hardware device triggers the specific operation as an instruction for performing the specific operation, which is stored in a storage circuit (e.g., memory) of the wireless power transmitting device 101 or the wireless power reception device 195, is executed.

Figure 2:
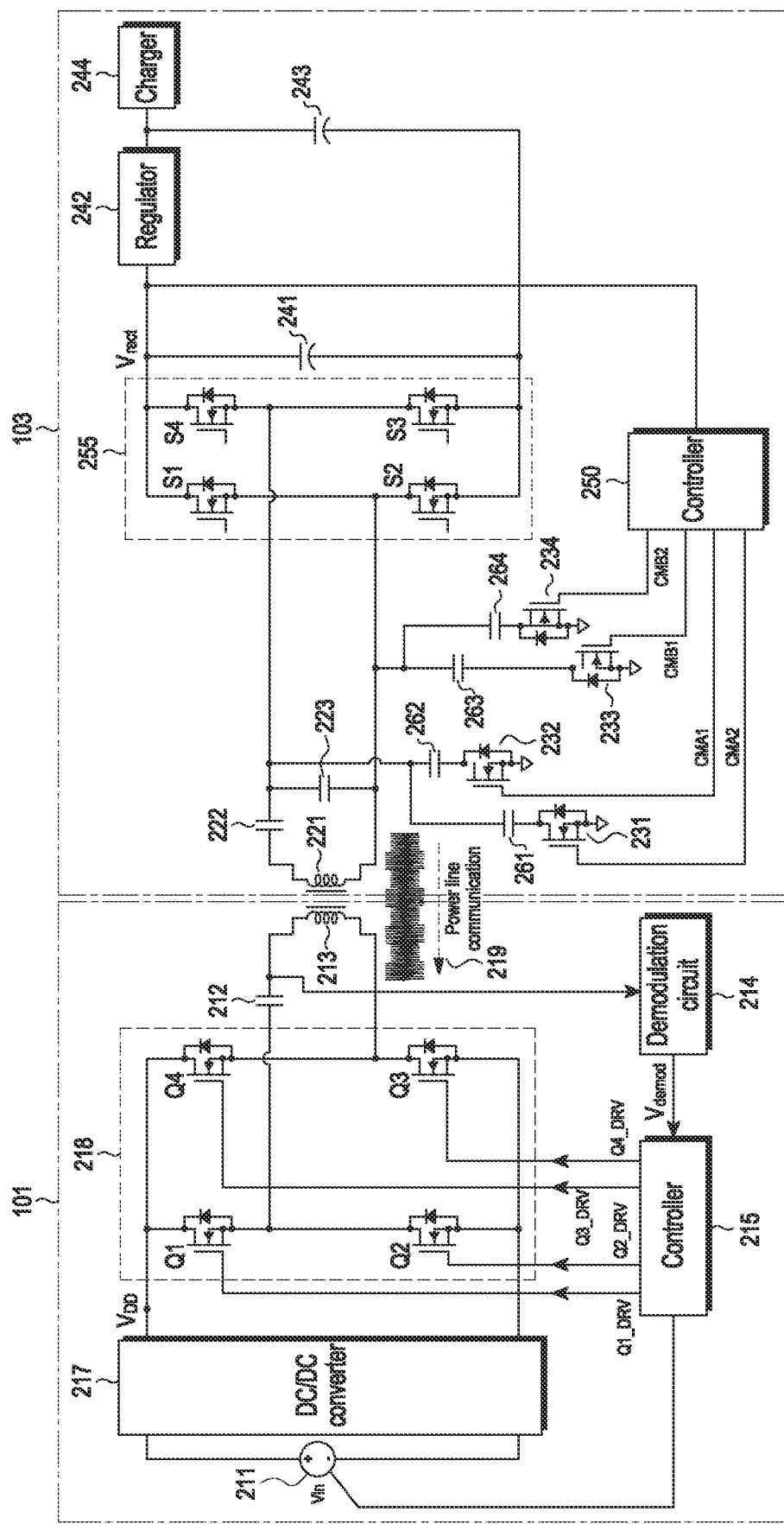
FIG. 2 is a block diagram illustrating a wireless power transmission device and a wireless power receiving device according to an embodiment.
Figure 3A:
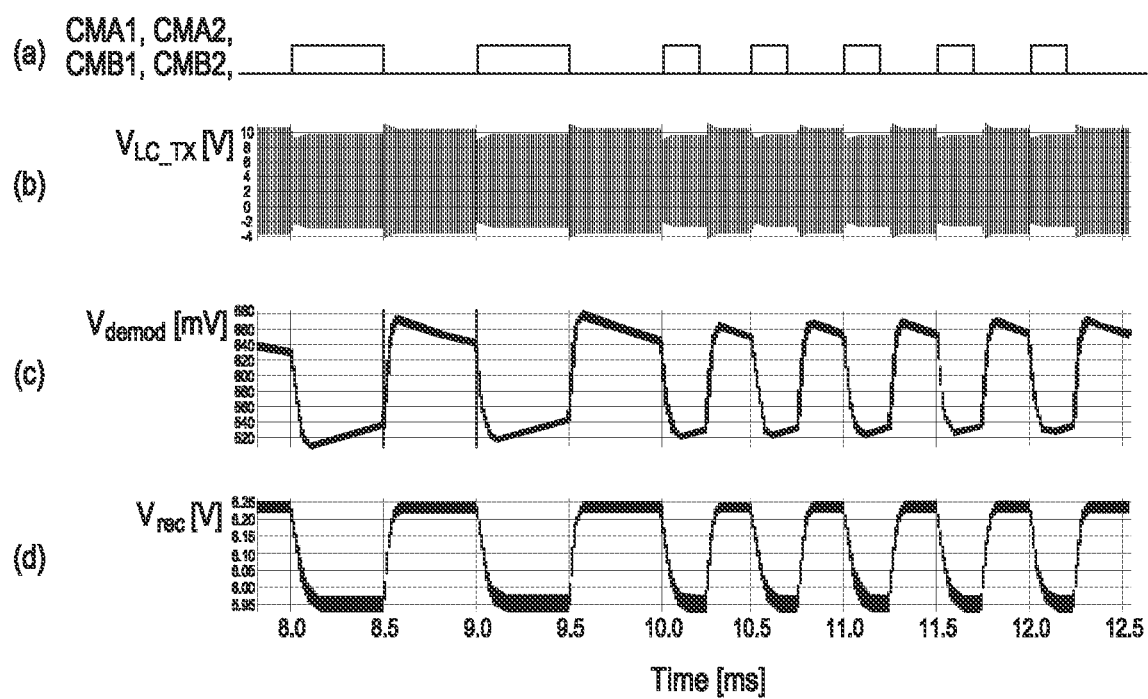
FIG. 3A illustrates signals according to control of switches corresponding to modulation capacitors in a wireless power receiving device according to an embodiment.
Figure 3B:
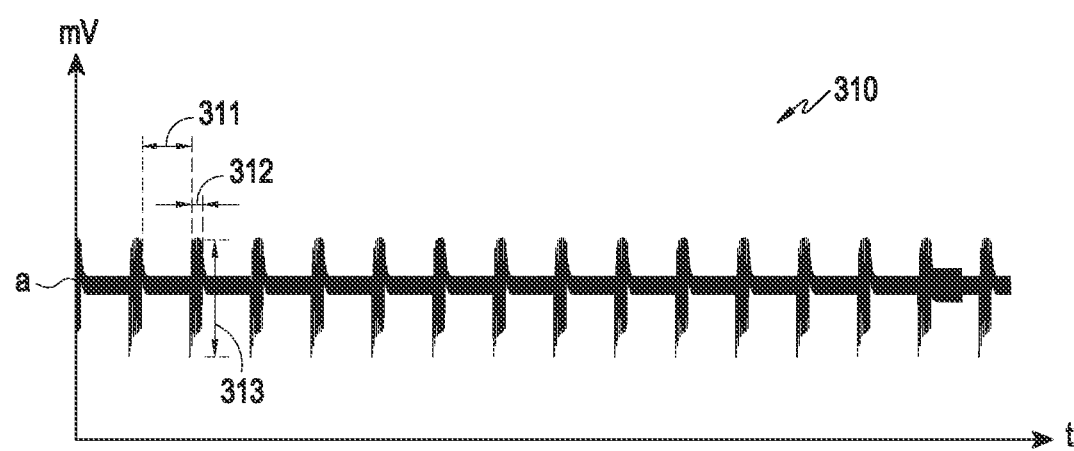
FIGS. 3B and 3C illustrate demodulated voltages identified as signals are demodulated in a transmission coil of a wireless power transmitting device according to an embodiment.
Figure 3C:
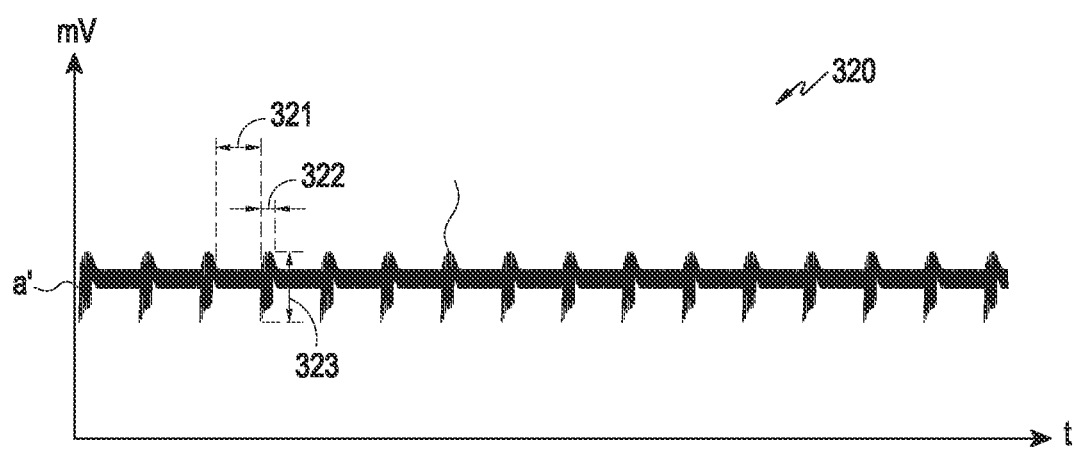
Figure 3D:
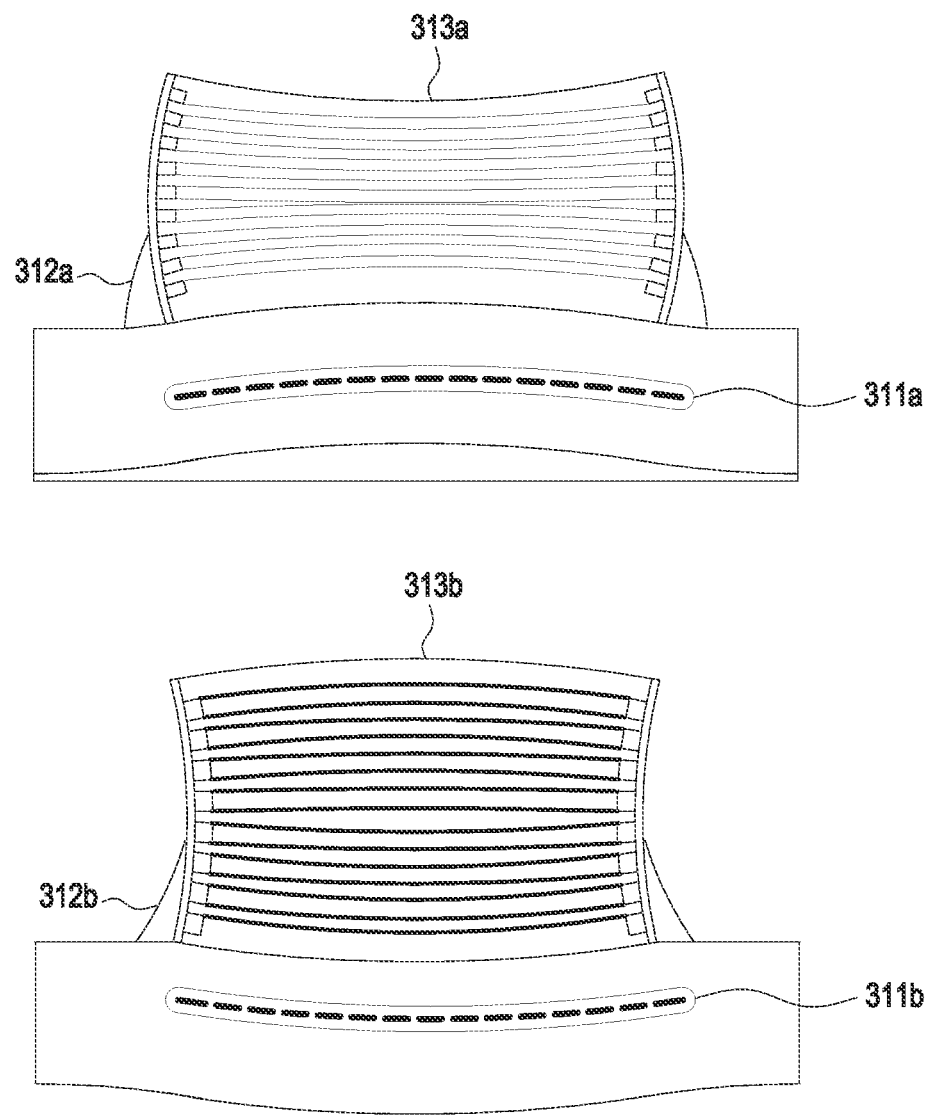
FIG. 3D is a view illustrating expansion and contraction of a capacitor of a wireless power transmitting device according to an embodiment.

FIG. 2 is a block diagram illustrating a wireless power transmission device and a wireless power receiving device according to an embodiment. The embodiment of FIG. 2 is described with reference to FIGS. 3A to 3D. FIG. 3A illustrates signals according to control of switches corresponding to modulation capacitors in a wireless power receiving device according to an embodiment. FIGS. 3B and 3C illustrate demodulated voltages identified as signals are demodulated in a transmission coil of a wireless power transmitting device according to an embodiment. FIG. 3D is a view illustrating expansion and contraction of a capacitor of a wireless power transmitting device according to an embodiment.

According to an embodiment, the wireless power transmitting device 101 may include at least one of a power source 211, an inverter 218 including a plurality of switches Q1, Q2, Q3, and Q4, a capacitor 212, a transmission coil 213, a demodulation circuit 214, a controller 215, or a DC/DC converter 217. The controller 215 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "controller" may be hardware in the claimed disclosure.

According to an embodiment, the power provided by the power source 211 may be provided to the DC/DC converter 217. The power source 211 may include at least one of an interface for connection with an external travel adapter (TA), a battery (not shown) of the wireless power transmitting device 101, a charger (not shown), or a power management integrated circuit (PMIC) (not shown). The power source 211 may provide, e.g., DC power to the DC/DC converter 217, but the type of power provided is not limited. The DC/DC converter 217 may convert the voltage of the received power and provide it to the inverter 218. The DC/DC converter 217 may change the voltage of the received DC power and provide the DC power having the changed voltage (or driving voltage $V_{DD}$) to the inverter 218. The DC/DC converter 217 may perform, e.g., buck conversion and/or boost conversion and may be implemented as, e.g., a 3-level converter, but it will be appreciated by one of ordinary skill in the art that the DC/DC converter 217 is not limited to a specific type of converter.

According to an embodiment, the inverter 218 may output AC power using the driving voltage $V_{DD}$ received from the DC/DC converter 217. The plurality of switches Q1, Q2, Q3, and Q4 may constitute, e.g., a full bridge circuit, but the number of switches or the type of bridge circuit is not limited. For example, when a full bridge circuit is configured, one end of the transmission coil 213 may be connected to a connection point between the switches Q1 and Q2 through the capacitor 212, and the other end of the transmission coil 213 may be connected to the connection point between the switches Q3 and Q4. The plurality of switches Q1, Q2, Q3, and Q4 may be controlled to be in an on state or an off state. For example, to generate AC power, the controller may control the second switch Q2 and the fourth switch Q4 in the off state while controlling the first switch Q1 and the third switch Q3 in the on state during a first period and may control the second switch Q2 and the fourth switch Q4 in the on state while controlling the first switch Q1 and the third switch Q3 in the off state during a second period and may repeatedly perform the above-described control operations. The controller 215 may provide the control signals Q1_DRV, Q2_DRV, Q3_DRV, and Q4_DRV for generating AC power described above to the plurality of switches Q1, Q2, Q3, and Q4. Here, not only outputting the control signal, but also refraining from outputting the control signal, may also be referred to as control of the controller 215. For example, that the controller 215 outputs the first control signal for generation of AC power having a first frequency to the inverter 218 may mean that the controller 215 may output the control signals Q1_DRV and Q3_DRV for controlling the switches Q1 and Q3 to be in the on state during a period corresponding to the first frequency and then output the control signals Q2_DRV and Q4_DRV for controlling the switches Q2 and Q4 to be in the on state during a period corresponding to the first period, and repeat the above-described output operations. Meanwhile, that the controller 215 outputs the second control signal for generation of AC power having a second frequency to the inverter 218 may mean that the controller 215 may output the control signals Q1_DRV and Q3_DRV for controlling the switches Q1 and Q3 to be in the on state during a period corresponding to the second frequency and then output the control signals Q2_DRV and Q4_DRV for controlling the switches Q2 and Q4 to be in the on state during a period corresponding to the second period, and repeat the above-described output operations. In this case, the period corresponding to the second frequency may differ from the period corresponding to the first frequency.

According to an embodiment, the AC power generated by the inverter 218 may be applied to the transmission coil 213. The capacitor 212 together with the transmission coil 213 may form a resonant circuit. The transmission coil 213 may generate a magnetic field based on the applied AC power. Part of the magnetic field (or magnetic flux) generated by the transmission coil 213 may pass through the cross section of the reception coil 221 of the wireless power receiving device 103. As the magnetic field passing through the cross section of the reception coil 221 is changed over time, an induced electromotive force (e.g., current, voltage, or power) may be generated around the reception coil 221.

According to an embodiment, the demodulation circuit 214 may demodulate the signal applied to the transmission coil 213 (e.g., the voltage 219 applied to both ends of the transmission coil 213) and output a demodulation signal $V_{demod}$. The demodulation circuit 214 may output the demodulation signal $V_{demod}$ by down-converting the signal applied to the transmission coil 213 (e.g., the voltage 219 between both the ends) by the frequency (e.g., 100 kHz to 210 kHz) of the AC power. For example, the demodulation circuit 214 may include a mixer and/or a multiplier circuit for removing the carrier wave component (e.g., 100 kHz to 210 kHz which is the frequency of the AC power) for wireless power transmission. Here, since the mixed waveform of the component by the modulation by the wireless power receiving device 103 and the AC power component by the wireless power transmitting device 101 may be applied to both the ends of the coil 213 of the wireless power transmitting device 101, the frequency component (e.g., 100 kHz to 210 kHz) of the AC power is referred to as the carrier wave component, but it will be appreciated by one of ordinary skill in the art that the wireless power receiving device 103 does not actually generate the electromagnetic waveform that is the mixture of the carrier wave and the modulated data. Thus, the carrier wave component (e.g., the frequency of AC power, 100 kHz to 210 kHz) may be removed from the voltage between both the ends of the transmission coil 213. The demodulation circuit 214 may additionally filter (low pass filter) the demodulation signal $V_{demod}$ and output it. The demodulation circuit 214 may include a low pass filter. Or, the demodulation circuit 214 may filter the voltage 219 between both the ends of the transmission coil 213 first and then down-convert it by the frequency (e.g., 100 kHz to 210 kHz) of AC power, thereby generating the demodulation signal $V_{demod}$. The amplitude of the voltage 219 between both the ends of the transmission coil 213 may be changed according to the ASK modulation by the wireless power receiving device 103. According to an embodiment, the controller 215 may identify the information provided from the wireless power receiving device 103, based on the demodulation signal $V_{demod}$ output by the demodulation circuit 214. The controller 215 may perform, e.g., analog-to-digital conversion (ADC) on the demodulation signal $V_{demod}$. The controller 215 may decode the digital value obtained as a result of the ADC and identify the information provided by the wireless power receiving device 103 according to the result of decoding. It will be appreciated by one of ordinary skill in the art that the decoding may follow, e.g., the Qi standard, but is not limited. Meanwhile, in the above-described embodiment, the demodulation circuit 214 performs frequency down-conversion (e.g., carrier wave removal) and/or low-pass filtering, and the controller 215 performs ADC and/or decoding, but this is merely an example. According to other embodiments, it will be appreciated by one of ordinary skill in the art that the demodulation circuit 214 may be implemented to further perform at least one of ADC or decoding and, according to another embodiment, the controller 215 may be implemented to further perform frequency down-conversion (e.g., carrier wave removal) and/or low-pass filtering.

According to an embodiment, the wireless power receiving device 103 may include at least one of a reception coil 221, a capacitor 222, a capacitor 223, a rectification circuit 255, a controller 250, a plurality of capacitors 261, 262, 263, and 264, a plurality of switches 231, 232, 233, and 234, a capacitor 241, a regulator 242, a capacitor 243, or a charger 244.

According to an embodiment, the reception coil 221, the capacitor 222, and the capacitor 223 may constitute a resonance circuit. One end of the capacitor 222 may be connected to the reception coil 221, and the other end of the capacitor 222 may be connected to one end of the capacitor 223 and one end of the rectification circuit 255. One end of the capacitor 223 may be connected to the other end of the capacitor 222, and the other end of the capacitor 223 may be connected to the other end of the reception coil 221. In other words, the capacitor 223 may be connected in parallel to a circuit formed by connecting the reception coil 221 and the capacitor 222 in series. The other end of the capacitor 223 may be connected to the other end of the rectification circuit 255.

According to an embodiment, the rectification circuit 255 may include a plurality of switches S1, S2, S3, and S4 constituting a full bridge circuit. One end of the resonance circuit may be connected to a connection point between the switches S1 and S2, and the other end of the resonance circuit may be connected to the connection point between the switches S3 and S4. The rectification circuit 255 may convert the AC power, received through the reception coil 221, into DC power. The controller 250 may control the on/off states of the plurality of switches S1, S2, S3, and S4 to convert AC power into DC power.

According to an embodiment, the capacitor 241 and the regulator 242 may be connected to the rectification circuit 255. One end of the capacitor 241 may be grounded. The regulator 242 may perform converting (e.g., buck converting and/or boost converting) and/or regulating on the voltage of the rectified power output from the power conversion circuit.

According to an embodiment, the charger 244 may charge the battery (not shown) with the power converted and/or regulated by the regulator 242. According to an embodiment, the charger 244 may control the voltage and/or current for charging the battery according to a battery charging mode (e.g., constant current (CC) mode, constant voltage (CV) mode, or quick charging mode). According to the implementation, a PMIC (not shown) in place of the charger 244 may be coupled to the regulator 242.

According to an embodiment, the controller 250 may perform modulation in response to information to be provided. The controller 250 may determine a capacitor in the plurality of capacitors 261, 262, 263, and 264 to be modulated. The difference in amplitude of the voltage 219 sensed by the wireless power transmitting device 101 may be changed according to the capacitor that is modulated. For example, it is assumed that the difference in the amplitude of the voltage 219 sensed in the wireless power transmitting device 101 (e.g., the difference between the maximum amplitude of the voltage 219 while the switch 231 is in the on state and the maximum amplitude of the voltage 219 while the switch 231 is in the off state) when modulation is performed with only one capacitor 261 is a first value. In this case, since the capacitors 262, 263, and 264 are not used for modulation, the switches 232, 233, and 234 may remain off. Meanwhile, the difference in the amplitude of the voltage 219 sensed in the wireless power transmitting device 101 (e.g., the difference between the maximum amplitude of the voltage 219 while the switches 231 and 232 are in the on state and the maximum amplitude of the voltage 219 while the switches 231 and 232 are in the off state) when modulation is performed with the capacitor 261 and the capacitor 262 is a second value which may be larger than the first value. In this case, since the capacitors 263 and 264 are not used for modulation, the switches 233 and 234 may remain off. The wireless power receiving device 103 may adjust the modulation degree (or modulation depth) as the capacitor to be modulated among the plurality of capacitors 261, 262, 263, and 264 is adjusted. As described above, the controller 215 may output and/or refrain from outputting at least some of the control signals CMA1, CMA2, CMB1, and CMB2 to maintain the off state of the switch corresponding to the capacitor not used for modulation, while performing modulation using the capacitor(s) determined for modulation. Meanwhile, for example, the capacitance of the capacitor 262 may be smaller than the capacitance of the capacitor 261, and the capacitance of the capacitor 264 may be smaller than the capacitance of the capacitor 263, but this is merely an example, and the size relationship in capacitance is not limited thereto, and for example the capacitances may be identical.

As described above, according to modulation in the wireless power receiving device 103, a difference in the amplitude of the voltage 219 in the transmission coil 213 may occur (e.g., a difference between the maximum amplitude while at least one switch in the wireless power receiving device 103 is in an on state and the maximum amplitude when the switch is in an off state). The difference in the amplitude of the voltage 219 in the transmission coil 213 according to modulation may cause a change in the voltage applied to the capacitor included in the wireless power transmitting device 101. For example, a voltage having a constant value should preferably be applied to the capacitor to which a DC voltage is applied but, according to the modulation of the wireless power receiving device 103, the voltage applied to the capacitor may be changed as well. For example, (a) of FIG. 3A illustrates control signals CMA1, CMA2, CMB1, and CMB2 for controlling a plurality of switches 231, 232, 233, and 234, output from the controller 250 when the plurality of switches 231, 232, 233, and 234 all are selected in the wireless power receiving device 103 of FIG. 2. For modulation, the control signals CMA1, CMA2, CMB1, and CMB2 may or may not be applied. (b) of FIG. 3A illustrates a voltage $V_{LC\_TX}$ between both ends of the transmission coil 213. As shown in (b), the voltage $V_{LC\_TX}$ between both the ends of the transmission coil 213 may be an AC waveform and have the frequency (e.g., 100 kHz to 210 kHz) of AC power provided from the inverter 218. Meanwhile, it may be identified that the maximum amplitude of the voltage $V_{LC\_TX}$ while the control signals CMA1, CMA2, CMB1, and CMB2 are applied differs from the maximum amplitude of the voltage $V_{LC\_TX}$ while the control signals CMA1, CMA2, CMB1, and CMB2 are not applied. (c) of FIG. 3A illustrates an output signal $V_{demod}$ of the demodulation circuit 214. (d) of FIG. 3A illustrates the voltage $V_{rec}$ (e.g., $V_{rect}$ of FIGS. 2 and 4) at the output end of the rectification circuit 255 of the wireless power receiving device 103. It may be identified that the value of the voltage $V_{rec}$ at the output end of the rectification circuit 255 of the wireless power receiving device 103 while the control signals CMA1, CMA2, CMB1, and CMB2 are applied differs between while the control signals CMA1, CMA2, CMB1, and CMB2 are applied and while the control signals CMA1, CMA2, CMB1, and CMB2 are not applied. Referring to (a) and (b) of FIG. 3A, it is identified that as the plurality of switches 231, 232, 233, and 234 repeat on/off, the maximum amplitude of the voltage $V_{LC\_TX}$ between both the ends of the transmission coil 213 is changed. Referring to (c) and (d) of FIG. 3A, it may be identified that the waveform of the output signal $V_{demod}$ into which the voltage $V_{LC\_TX}$ is output via the demodulation circuit 214 is similar to the waveform of the voltage $V_{rec}$ at the output end of the rectification circuit 255. The controller 215 may identify information provided by the wireless power receiving device 103 based on the result of processing (e.g., ADC and/or decoding) of the output signal $V_{demod}$.

FIGS. 3B and 3C illustrate the demodulated voltage generated (or output) from the demodulation circuit 214. FIG. 3B may illustrate an output signal 310, e.g., when the wireless power receiving device 103 selects a first group from among a plurality of capacitors 261, 262, 263, and 264 for modulation. As shown in FIG. 3B, a first portion 311 of the output signal 310 is a waveform during a period when modulation is not performed in the wireless power receiving device 103 and may substantially have a magnitude of a. A second portion 312 of the output signal 310 is a waveform during a period when modulation is performed in the wireless power receiving device 103, and a waveform change which has a first peak-to-peak 313 centered on the magnitude of a may be identified. An enlarged second portion 312 may be similar to, e.g., the output signal $V_{demod}$ of the demodulation circuit 214 of (c) of FIG. 3A. The frequency of the second portion 312 may correspond to, e.g., the modulation frequency (e.g., 2 kHz). Like a change in the amplitude of the second portion 312, a voltage change may occur in another capacitor in the wireless power transmitting device 101. FIG. 3C may illustrate an output signal 320, e.g., when the wireless power receiving device 103 selects a second group from among a plurality of capacitors 261, 262, 263, and 264 for modulation. As shown in FIG. 3C, a first portion 321 of the output signal 320 is a waveform during a period when modulation is not performed in the wireless power receiving device 103 and may substantially have a magnitude of a'. a' may be identical to or different from a. A second portion 322 of the output signal 320 is a waveform during a period when modulation is performed in the wireless power receiving device 103, and a waveform change which has a second peak-to-peak 323 centered on the magnitude of a' may be identified. It may be identified that the first peak-to-peak 313 in FIG. 3B is larger than the second peak-to-peak 323 in FIG. 3C. Meanwhile, a relatively larger peak-to-peak may cause relatively larger contraction and expansion of the capacitor as shown in FIG. 3B. For example, referring to FIG. 3D, as the voltage applied to the capacitor is changed, the capacitor may be charged and discharged. The capacitor may be a capacitor disposed in the power path from, e.g., the power source 211 to the transmission coil 213 (e.g., a capacitor for buffering or a capacitor for filtering) or a capacitor included in hardware (e.g., DC/DC converter), but is not limited thereto as long as it is included in the wireless power transmitting device 101. For example, during discharge, the capacitor may have a first shape 313a and, during charge, the capacitor may have a second shape 313b. The change in the shape of the capacitor according to the charge and discharge may cause deformation of the surrounding hardware, e.g., the PCB or solder. For example, when the capacitor has the first shape 313a, the PCB may have a first shape 311a, and the solder may have a first shape 312a. For example, when the capacitor has the second shape 313b, the PCB may have a second shape 311b, and the solder may have a second shape 312b. Vibration may occur due to such deformation and, when the frequency of the vibration is included in an audible band (e.g., 20 Hz to 20,000 Hz), audible noise may be heard by the user. As the difference in voltage between when charged and when discharged is relatively larger, a relatively larger audible noise may be caused. As the degree of modulation of the wireless power receiving device 103 increases (e.g., as the number of modulation capacitors increases), the degree of change in voltage in the capacitor increases, so that the magnitude of audible noise may increase. According to an embodiment, the wireless power transmitting device 101 may perform various operations to reduce audible noise when the magnitude of audible noise is relatively large (or when the magnitude of audible noise is expected to be relatively large), which is described below. Meanwhile, that as the number of modulation capacitors used in the wireless power receiving device 103 increases, the change in voltage in the capacitor of the wireless power transmitting device 101 increases is merely an example, and other correlations are also possible. According to an embodiment, audible noise may occur in the wireless power receiving device 103 as well. The voltage applied to the capacitor (e.g., the capacitor 241 and/or the capacitor 243) may be varied by the modulation operation performed by the wireless power receiving device 103, so that audible noise may be generated according to the vibration of the capacitor. Prior to describing the operation for reducing audible noise, circuit analysis associated with the generation of audible noise is described with reference to FIG. 4.

Figure 4:
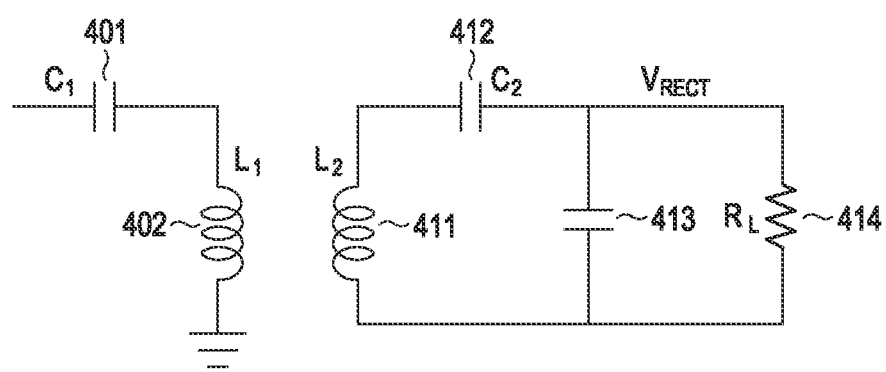
FIG. 4 illustrates an equivalent circuit of a wireless power transmission system according to an embodiment.

FIG. 4 illustrates an equivalent circuit of a wireless power transmission system according to an embodiment.

According to an embodiment, a wireless power transmission system (e.g., a wireless power transmission system including the wireless power transmitting device 101 and the wireless power receiving device 103 of FIG. 2) may be represented as an equivalent circuit of FIG. 4. The wireless power transmitting device side may be represented as a capacitor 401 having a capacitance of $C_1$ and a coil 402 having an inductance of $L_1$. Meanwhile, the voltage applied to the coil 402 is represented as $V_{TX}$, and the current applied to the coil 402 is represented as $I_{TX}$. The wireless power receiving device side may be represented as a capacitor 412 having a capacitance of $C_2$, a modulation capacitor 413 having a capacitance of $C_m$, a coil 411 having an inductance of $L_2$, and a load 414 having a resistance of $R_L$. For example, as the number of capacitors used for modulation among the capacitors 261, 262, 263, and 264 in FIG. 2 is changed, $C_m$ may be changed. $I_{TX}$ may be expressed by Equation 1.

$$I_{TX} = \frac{[1-\omega C_m X_{RX}]+jX_{RX}/R_L}{[\omega C_m(X_{TX}X_{RX}-\omega^2 M^2)-X_{TX}]-j\left(\frac{X_{TX}X_{RX}-\omega^2 M^2}{R_L}\right)}(jV_{TX}) \quad \text{[Equation 1]}$$

In Equation 1, $X_{TX}$ may be $\omega L_1 - 1/(\omega C_1)$. $X_{RX}$ may be $\omega L_2 - 1/(\omega C_2)$. $\omega$ may be the angular frequency corresponding to the operating frequency. M may be the mutual inductance between the coils 402 and 411. If the capacitance of $C_m$ is changed, $I_{TX}$ may also be changed so that the size of change in the voltage of the capacitor included in the wireless power transmitting device 101 may be changed. The size of change in the voltage of the capacitor may be associated (e.g., proportional) with, e.g., I. Further, $I_{TX}$ may be changed according to at least one of the operating frequency of the inverter 218, coil characteristics, the current flowing through the load 414, K (or M) according to the alignment of the wireless power transmitting device 101 and the wireless power receiving device 103, elements of impedance, the $V_{rect}$ value targeted in the wireless power receiving device 103, and the load resistance of the wireless power receiving device 103, and the corresponding elements may affect the audible noise generated in the capacitor. Accordingly, if the wireless power transmitting device 101 changes, e.g., the operating frequency, it is possible to reduce the audible noise generated in the capacitor.

Meanwhile, the output voltage $V_{rect}$ of the rectification circuit 255 of the wireless power receiving device 103 may be expressed as in Equation 2.

$$V_{RECT} = \frac{\omega M V_{TX}}{[\omega C_m(X_{TX}X_{RX}-\omega^2 M^2)-X_{TX}]-j\left(\frac{X_{TX}X_{RX}-\omega^2 M^2}{R_L}\right)} \quad \text{[Equation 2]}$$

If the capacitance of $C_m$ is changed, $V_{rect}$ may also be changed so that the size of change in the voltage of the capacitor included in the wireless power receiving device 103 may be changed. The size of change in the voltage of the capacitor may be associated (e.g., proportional) with, e.g., $V_{rect}$. Further, $V_{rect}$ may be changed according to the operating frequency of the inverter 218, the coil characteristics, the current flowing through the load 414, K (or M) according to the alignment of the wireless power transmitting device 101 and the wireless power receiving device 103, and the elements of the impedance, and the corresponding elements may affect the audible noise generated in the capacitor. Accordingly, if the wireless power transmitting device 101 changes, e.g., the operating frequency by a request from the wireless power receiving device 103, it is possible to reduce the audible noise generated in the capacitor.

Figure 5A:
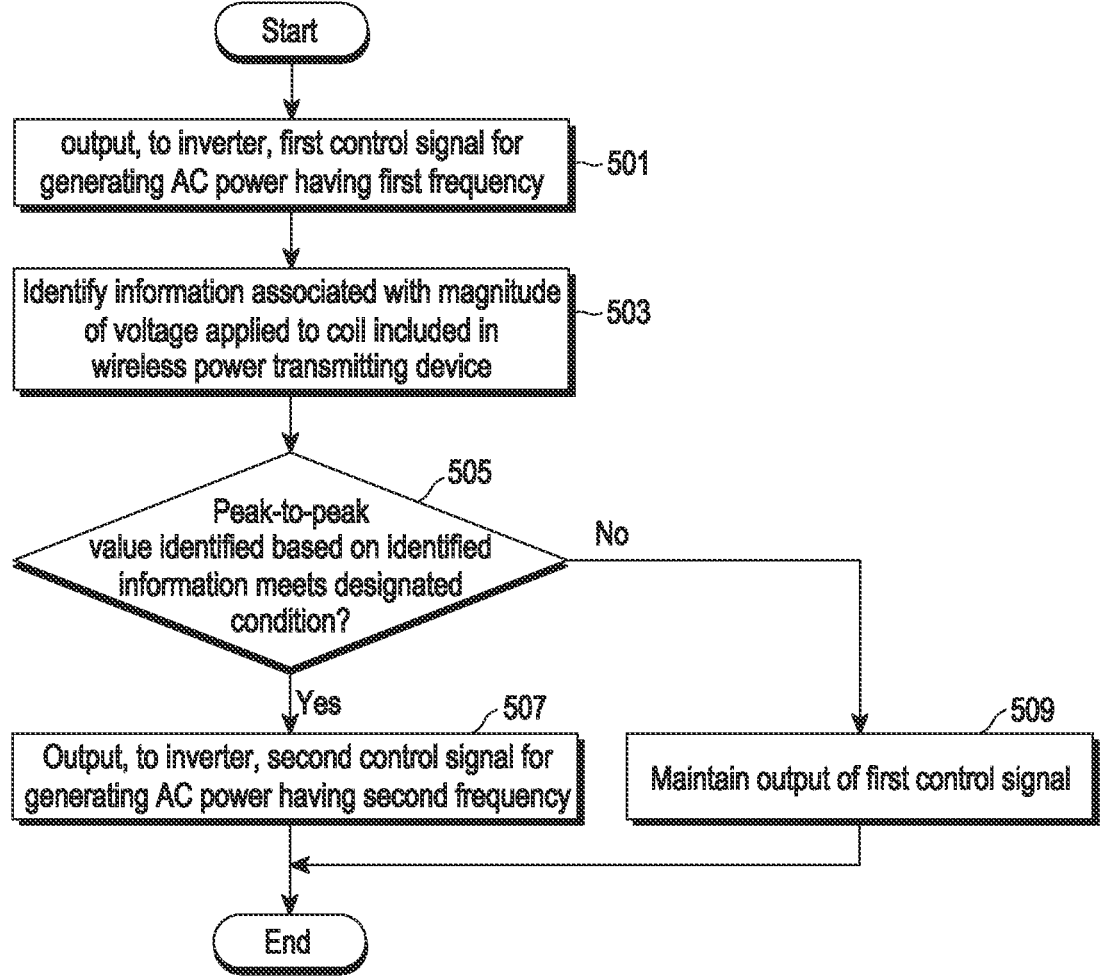
FIG. 5A is a flowchart illustrating an operation method of a wireless power transmitting device according to an embodiment.

FIG. 5A is a flowchart illustrating an operation method of a wireless power transmitting device according to an embodiment.

According to an embodiment, the wireless power transmitting device 101 (e.g., the controller 215) may output a first control signal for generating AC power of a first frequency to the inverter 218 in operation 501. As described above, the wireless power transmitting device 101 may apply the first control signal to each of the switches Q1, Q2, Q3, and Q4 of the inverter 218 to control the switches Q1 and Q3 to be in the on state during a first period corresponding to the first frequency and then control the switches Q2 and Q4 to be in the on state during a period corresponding to the first period. There is no limit to the way for setting the first frequency.

According to an embodiment, in operation 503, the wireless power transmitting device 101 may identify information associated with the magnitude of the voltage applied to the transmission coil 213 included in the wireless power transmitting device 101. In an example, the wireless power transmitting device 101 may identify the demodulated voltage (e.g., (c) of FIG. 3A, 310 of FIG. 3B or 320 of FIG. 3C) generated by demodulating the signal (e.g., an applied voltage) applied to the transmission coil 213, as the information associated with the magnitude of the voltage applied to the transmission coil 213. In another example, the wireless power transmitting device 101 may identify the magnitude itself of the voltage applied to the transmission coil 213 as the information associated with the magnitude of the voltage applied to the transmission coil 213. It will be appreciated by one of ordinary skill in the art that the wireless power transmitting device 101 may include a sensor capable of identifying the magnitude of the voltage applied to the transmission coil 213. For example, since AC power is applied to the transmission coil 213, the magnitude of voltage may be detected as a sine wave having the frequency of the AC power. It will be appreciated by one of ordinary skill in the art that, like the magnitude of voltage in the transmission coil 213 in the disclosure, the magnitude for AC waveform may mean the amplitude (e.g., maximum value) changed according to the AC waveform such as a sine wave. Meanwhile, it will be appreciated by one of ordinary skill in the art that any parameter associated with the magnitude of voltage in the transmission coil 213 may be used as the information associated with the magnitude of voltage. Meanwhile, it will be appreciated by one of ordinary skill in the art that any parameter associated with the magnitude of voltage in the transmission coil 213 may be used as the information associated with the magnitude of voltage. Meanwhile, as the wireless power receiving device 103 performs modulation, the information associated with the magnitude of voltage of the transmission coil 213 may be changed. For example, the information associated with the magnitude of voltage identified while the switch for modulation of the wireless power receiving device 103 is in the off state may differ from the information associated with the magnitude of voltage identified while the switch for modulation is in the on state. For example, the wireless power transmitting device 101 may identify the difference between the information associated with the magnitude of voltage identified while the switch of modulation of the wireless power receiving device 103 is in the off state and the information associated with the magnitude of voltage identified while the switch for modulation is in the on state, as a peak-to-peak value. Meanwhile, it will be appreciated by one of ordinary skill in the art that the above-described voltage is merely an example, and the wireless power transmitting device 101 may alternatively (or additionally) use at least one of current or power.

For example, the wireless power transmitting device 101 may identify a plurality of peak-to-peak values during a predetermined period and set the average thereof as the peak-to-peak value, but this is exemplary, and the method for setting the peak-to-peak value is not limited.

Meanwhile, in another embodiment, the wireless power transmitting device 101 may use the peak-to-peak value (e.g., the difference between the voltages measured when the switch connected to the modulation capacitor of the wireless power receiving device 103 is in the on state and when the switch is in the off state) based on the magnitude of the voltage applied to various elements, as well as the voltage applied to the transmission coil 213. The wireless power transmitting device 101 may include at least one sensor capable of identifying the magnitude of the voltage applied to various devices. For example, the wireless power transmitting device 101 may identify the peak-to-peak value based on the voltage applied to the capacitor causing noise (e.g., at least one of a capacitor included in the DC/DC converter 217, a capacitor for filtering, or a capacitor for buffering). It will be appreciated by one of ordinary skill in the art that the peak-to-peak value may be identified based on the voltage at any other points where a difference occurs between the voltages measured while the switch connected to the modulation capacitor of the wireless power receiving device 103 is in the on state and while the switch is in the off state, than the capacitor. Further, as described above, at least one of current, power, or impedance, as well as voltage, may be alternatively (or additionally) used to identify the peak-to-peak value.

According to an embodiment, in operation 505, the wireless power transmitting device 101 may identify whether the peak-to-peak value identified based on the identified information meets a designated condition. For example, the wireless power transmitting device 101 may identify that the designated condition is met when the peak-to-peak value is a predesignated value or more. As described above, the audible noise may be caused when the capacitor contracts and expands, and as the degree of deformation due to contraction and expansion increases, the magnitude of the audible noise may also increase. This may mean that as the peak-to-peak value increases, the magnitude of audible noise may increase. Accordingly, in an example, the wireless power transmitting device 101 may identify that the designated condition is met based on the peak-to-peak value being the predesignated value or more. Meanwhile, the designated condition is not limited but may be any condition indicating that the audible noise is a predetermined magnitude or more. If the peak-to-peak value meets the designated condition (Yes in 505), the wireless power transmitting device 101 may output a second control signal for generating AC power of a second frequency to the inverter 218 in operation 507. As described above, the wireless power transmitting device 101 may apply the second control signal to each of the switches Q1, Q2, Q3, and Q4 of the inverter 218 to control the switches Q1 and Q3 to be in the on state during a second period corresponding to the second frequency and then control the switches Q2 and Q4 to be in the on state during a period corresponding to the second period. Certain embodiments of setting the second frequency are described below. When the peak-to-peak value does not meet the designated condition (No in 505), the wireless power transmitting device 101 may maintain the output of the first control signal in operation 509. Accordingly, the frequency of the magnetic field formed by the wireless power transmitting device 101 may be maintained as the first frequency. Meanwhile, the wireless power transmitting device 101 may change the frequency for purposes other than noise mitigation. For example, the wireless power transmitting device 101 may identify a power adjustment request (e.g., the control error packet (CEP) of the Qi standard) from the wireless power receiving device 103 and may change the frequency to adjust the magnitude of the transmission power.

Figure 5B:
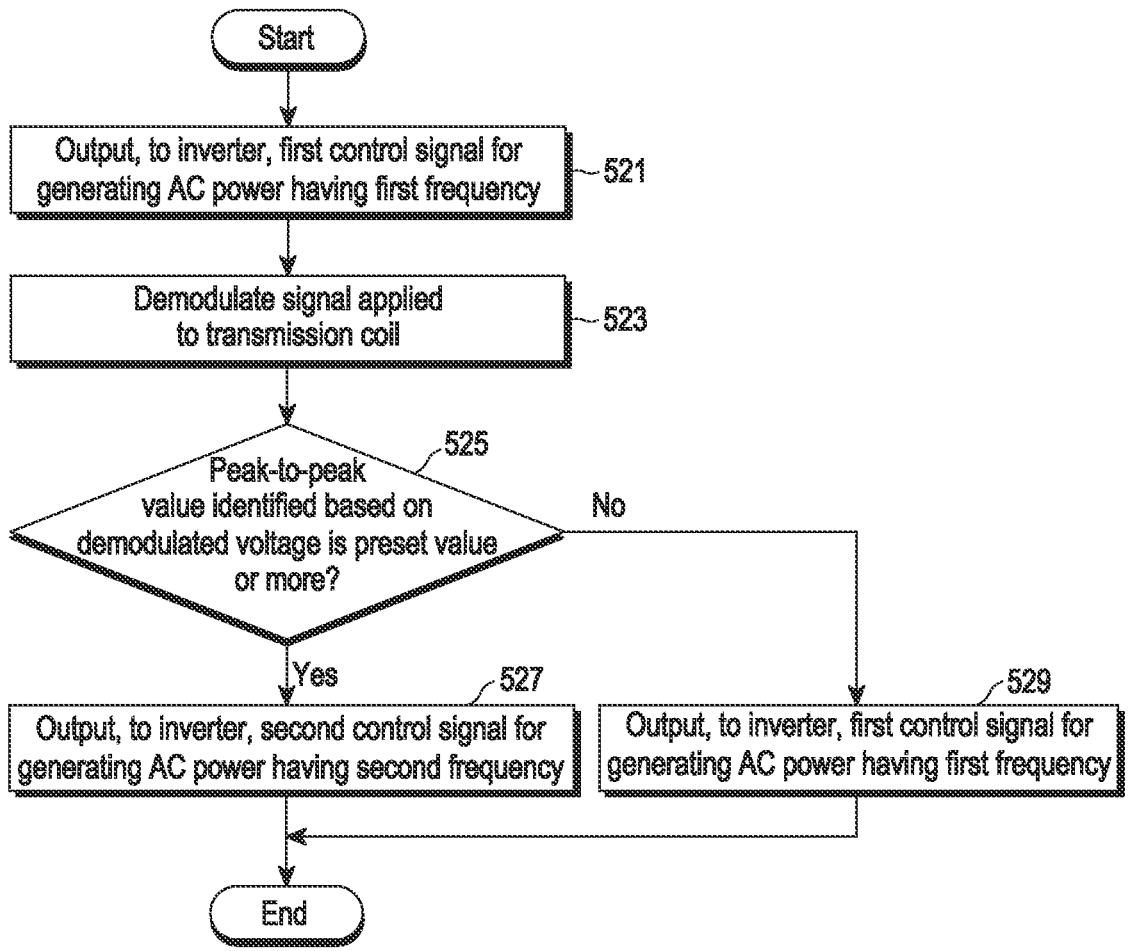
FIG. 5B is a flowchart illustrating an operation method of a wireless power transmitting device according to an embodiment.

FIG. 5B is a flowchart illustrating an operation method of a wireless power transmitting device according to an embodiment.

According to an embodiment, the wireless power transmitting device 101 (e.g., the controller 215) may output a first control signal for generating AC power of a first frequency to the inverter 218 in operation 521. The wireless power transmitting device 101 (e.g., the demodulation circuit 214) may demodulate the signal (e.g., the signal as shown in (b) of FIG. 3A) applied to the transmission coil 213 in operation 523. According to the result of demodulation, a demodulated voltage as shown in (c) of FIG. 3A, 310 of FIG. 3B, or 320 of FIG. 3C may be identified. In operation 525, the wireless power transmitting device 101 may identify whether the peak-to-peak value (e.g., 313 of FIG. 3B or 323 of FIG. 3C) identified based on the demodulated voltage is a preset value or more. If the peak-to-peak value is the preset value or more (Yes in 525), the wireless power transmitting device 101 may output a second control signal for generating AC power of a second frequency, different from the first frequency, to the inverter 218 in operation 527. If the peak-to-peak value is less than the preset value (No in 525), the wireless power transmitting device 101 may output a first control signal for generating AC power of the first frequency to the inverter 218 in operation 529 and may maintain the output of the first control signal.

Figure 6A:
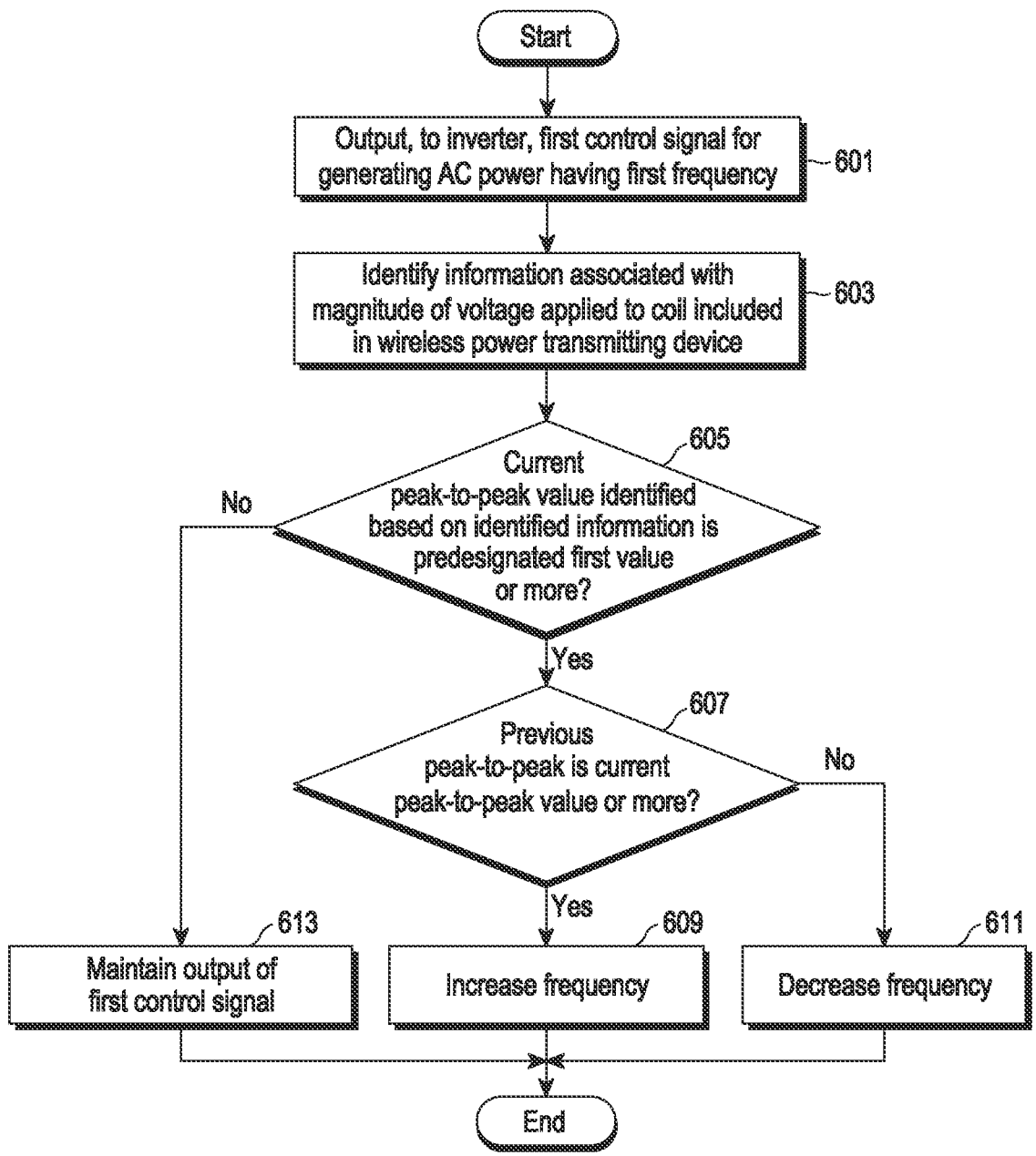
FIG. 6A is a flowchart illustrating an operation method of a wireless power transmitting device according to an embodiment.

FIG. 6A is a flowchart illustrating an operation method of a wireless power transmitting device according to an embodiment.

According to an embodiment, the wireless power transmitting device 101 (e.g., the controller 215) may output a first control signal for generating AC power of a first frequency, larger than the prior frequency, to the inverter in operation 601. For example, it is assumed that the wireless power transmitting device 101 increases the frequency before performing the embodiment of FIG. 6A for mitigation of audible noise. In operation 603, the wireless power transmitting device 101 may identify information associated with the magnitude of the voltage applied to the coil included in the wireless power transmitting device 101. Since the information associated with the magnitude of the voltage has been described with reference to FIG. 5A, duplicative detailed description thereof will be omitted. In operation 605, the wireless power transmitting device 101 may determine whether the current peak-to-peak value identified based on the identified information is a predesignated first value or more. The predesignated first value is a peak-to-peak value corresponding to the case where the magnitude of the audible noise is at an audible level and may be experimentally set.

The predesignated first value may be a fixed value or a changeable value. For example, the wireless power transmitting device 101 may set the predesignated first value based on a request from the wireless power receiving device 103. The user of the wireless power receiving device 103 may manipulate the wireless power receiving device 103 to input an audible noise adjust command. The wireless power receiving device 103 may transmit an audible noise adjust request packet based on the audible noise adjust command input by the user. Or, the wireless power receiving device 103 may identify the magnitude of the audible noise using an included microphone. If the magnitude of the audible noise is a threshold magnitude or more, the wireless power receiving device 103 may transmit the audible noise adjust request packet. The wireless power transmitting device 101 may set the peak-to-peak value corresponding to the time of identifying the packet to the predesignated first value based on identifying the packet from the wireless power receiving device 103. Meanwhile, the wireless power transmitting device 101 may provide a user interface screen (or voice output) inquiring whether audible noise is heard. The user may input the audible noise adjust command until the user does not hear audible noise any longer. The wireless power transmitting device 101 may transmit the audible noise adjust request packet based on receiving the audible noise adjust command. The wireless power transmitting device 101 may set the new peak-to-peak value (or update the peak-to-peak value) corresponding to the time of identifying the packet upon identifying the packet from the wireless power receiving device 103.

In another example, the wireless power transmitting device 101 may set the predesignated value based on the ambient environment. For example, it is possible to identify the magnitude of the noise of the ambient environment using the microphone included in the wireless power transmitting device 101 or to receive information about the magnitude of the noise of the ambient environment from the wireless power receiving device 103. If the magnitude of the noise of the ambient environment is relatively large, it is less likely for the audible noise to be heard by the user although the audible noise is caused. Thus, the wireless power transmitting device 101 may set a relatively low predesignated value. If the magnitude of the noise of the ambient environment is relatively small, it is more likely for the audible noise to be heard by the user although the audible noise is caused. Thus, the wireless power transmitting device 101 may set a relatively high predesignated value. Or, on the contrary, in another example, the wireless power transmitting device 101 may set a large predesignated value when the magnitude of noise is rather relatively large. Since the noise may be caused by the wireless power transmitting device 101 and/or the wireless power receiving device 103, the wireless power transmitting device 101 may set a large predesignated value when the magnitude of noise is relatively large and set a small predesignated value when the magnitude of noise is relatively small. Meanwhile, besides the ambient noise, various other parameters may be used, such as setting a relatively low predesignated value during the night time and setting a relatively high predesignated value during the daytime by the wireless power transmitting device 101.

According to an embodiment, in operation 607, the wireless power transmitting device 101 may determine whether the previous peak-to-peak value is the current peak-to-peak or more. If the previous peak-to-peak value is the current peak-to-peak or more (Yes in 607), the wireless power transmitting device 101 may perform the operation of increasing the frequency in operation 609. That the previous peak-to-peak value is the current peak-to-peak or more may mean that the magnitude of audible noise has been reduced, meaning that the current frequency adjustment (i.e., increasing the frequency) has reduced the magnitude of audible noise. Accordingly, the wireless power transmitting device 101 may maintain the adjustment stance (i.e., increasing the frequency). The degree of change in frequency (e.g., degree of increase) of the wireless power transmitting device 101 may be a change in frequency by a preset size (e.g., about 1.27 kHz), as an example. Or, the degree of change may be determined depending on the rate relative to the initial frequency before the frequency adjustment. For example, if the initial frequency is 127 kHz, and the degree of change is 1%, the wireless power transmitting device 101 may change the frequency by 1.27 kHz which is 1% of 127 kHz in which case the degree of change may be varied depending on the initial frequency.

If the previous peak-to-peak value is less than the current peak-to-peak (No in 607), the wireless power transmitting device 101 may perform the operation of decreasing the frequency in operation 611. That the previous peak-to-peak value is less than the current peak-to-peak may mean that the magnitude of audible noise has been increased, meaning that the current frequency adjustment (i.e., increasing the frequency) has instead increased the magnitude of audible noise. Accordingly, the wireless power transmitting device 101 may stop or reverse the adjustment stance (i.e., increasing the frequency) to reduce frequency. When the peak-to-peak value is less than a first predesignated value (No in 605), the wireless power transmitting device 101 may maintain the output of the first control signal in operation 613.

Figure 6B:
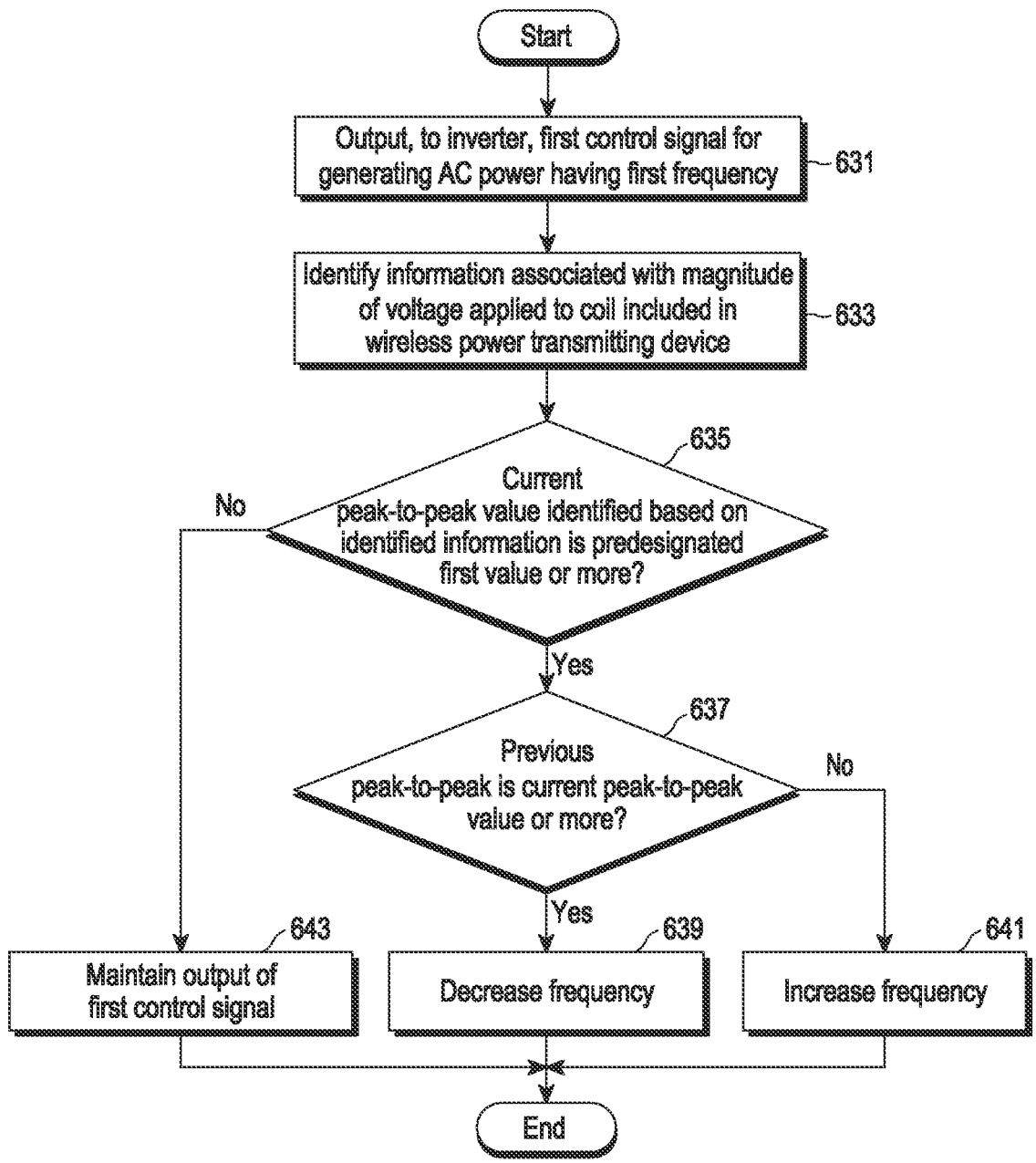
FIG. 6B is a flowchart illustrating an operation method of a wireless power transmitting device according to an embodiment.

FIG. 6B is a flowchart illustrating an operation method of a wireless power transmitting device according to an embodiment.

According to an embodiment, the wireless power transmitting device 101 (e.g., the controller 215) may output a first control signal for generating AC power of a first frequency, larger than the prior frequency, to the inverter in operation 631. For example, it is assumed that the wireless power transmitting device 101 decreases the frequency before performing the embodiment of FIG. 6B for mitigation of audible noise. In operation 633, the wireless power transmitting device 101 may identify information associated with the magnitude of the voltage applied to the coil included in the wireless power transmitting device 101. In operation 635, the wireless power transmitting device 101 may determine whether the current peak-to-peak value identified based on the identified information is a predesignated first value or more.

If the current peak-to-peak value is not less than the predesignated first value (Yes in 635), according to an embodiment, the wireless power transmitting device 101 may determine that the previous peak-to-peak value is the current peak-to-peak or more in operation 637. If the previous peak-to-peak value is the current peak-to-peak or more (Yes in 637), the wireless power transmitting device 101 may perform the operation of decreasing the frequency in operation 639. That the previous peak-to-peak value is the current peak-to-peak or more may mean that the magnitude of audible noise has been reduced, meaning that the current frequency adjustment (i.e., decreasing the frequency) has reduced the magnitude of audible noise. Accordingly, the wireless power transmitting device 101 may maintain the adjustment stance (i.e., decreasing the frequency). If the previous peak-to-peak value is less than the current peak-to-peak (No in 637), the wireless power transmitting device 101 may perform the operation of increasing the frequency in operation 641. That the previous peak-to-peak value is less than the current peak-to-peak may mean that the magnitude of audible noise has been increased, meaning that the current frequency adjustment (i.e., decreasing the frequency) has instead increased the magnitude of audible noise. Accordingly, the wireless power transmitting device 101 may stop or reverse the adjustment stance (i.e., decreasing the frequency) to increase frequency. When the peak-to-peak value is less than the first predesignated value (No in 635), the wireless power transmitting device 101 may maintain the output of the first control signal in operation 643. As described above, the wireless power transmitting device 101 may determine whether to maintain the current frequency change stance depending on the peak-to-peak value before the frequency change and the peak-to-peak value after the frequency change. In another embodiment, the wireless power transmitting device 101 may change the frequency in a default adjustment direction upon changing the initial frequency but the way to change the initial frequency is not limited.

Figure 6C:
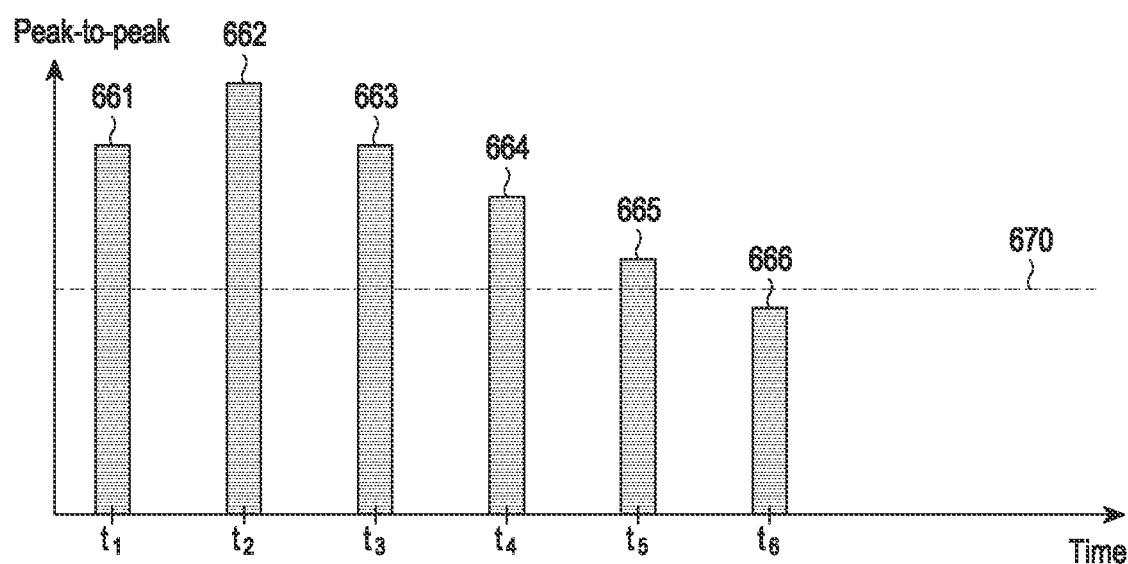
FIG. 6C is a view illustrating a change in peak-to-peak value by frequency adjustment according to an embodiment.

FIG. 6C is a view illustrating a change in peak-to-peak value by frequency adjustment according to an embodiment.

According to an embodiment, the wireless power transmitting device 101 may identify a peak-to-peak value 661 at a first time t1 and may identify that the peak-to-peak value 661 is larger than or equal to the predesignated first value 670. The wireless power transmitting device 101 may change the frequency based on the peak-to-peak value 661 being equal to or larger than the first predesignated value 670. For example, to implement the first change in frequency, the wireless power transmitting device 101 may increase the frequency in the default direction, but the first change direction of frequency and/or the way to determine the first change direction is not limited. The wireless power transmitting device 101 may identify a peak-to-peak value 662 at a second time t2. The wireless power transmitting device 101 may identify that the peak-to-peak value 662 is the predesignated first value 670 or more at the second time t2. The wireless power transmitting device 101 may identify that the peak-to-peak value 662 after the frequency change (frequency increase) is larger than the peak-to-peak value 661 before the frequency change (frequency increase). The wireless power transmitting device 101 may change the stance of frequency change based on the peak-to-peak value 662 after the frequency change (frequency increase) being larger than the peak-to-peak value 661 before the frequency change (frequency increase). The wireless power transmitting device 101 may switch the stance of frequency change from increasing to decreasing. The wireless power transmitting device 101 may reduce the frequency and then, at a third time t3, identify a peak-to-peak value 663. The wireless power transmitting device 101 may identify that the peak-to-peak value 663 is the predesignated first value 670 or more at the third time t3. The wireless power transmitting device 101 may identify that the peak-to-peak value 663 after the frequency change (frequency decrease) is smaller than the peak-to-peak value 662 before the frequency change (frequency decrease). The wireless power transmitting device 101 may maintain the stance of frequency change based on the peak-to-peak value 663 after the frequency change (frequency decrease) being smaller than the peak-to-peak value 662 before the frequency change (frequency decrease). The wireless power transmitting device 101 may identify peak-to-peak values 664 and 665 at a fourth time t4 and a fifth time t5 and identify that the identified values 664 and 665 are the predesignated first value 670 or more. The wireless power transmitting device 101 may change the frequency at a fifth time t5 as well. The wireless power transmitting device 101 may identify a peak-to-peak value 666 at a sixth time t6 and identify that the identified peak-to-peak value 666 is less than the predesignated first value 670. The wireless power transmitting device 101 may maintain the frequency based on the peak-to-peak value 666 being less than the predesignated first value 670.

Figure 7:
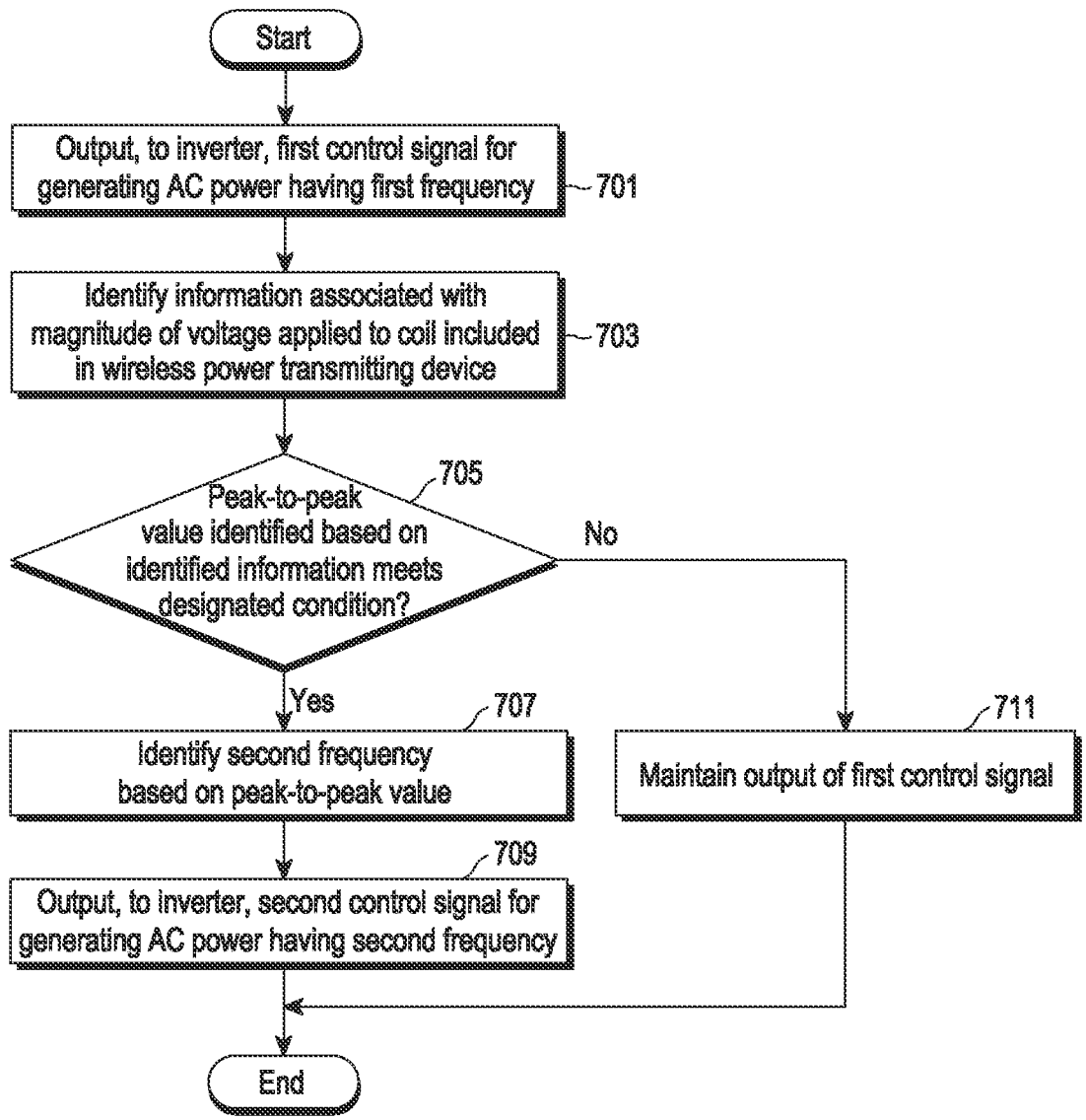
FIG. 7 is a flowchart illustrating an operation method of a wireless power transmitting device according to an embodiment.

FIG. 7 is a flowchart illustrating an operation method of a wireless power transmitting device according to an embodiment.

According to an embodiment, the wireless power transmitting device 101 (e.g., the controller 215) may output a first control signal for generating AC power of a first frequency to the inverter in operation 701. For example, the wireless power transmitting device 101 may set the first frequency based on information (e.g., charging mode such as quick charging mode or normal charging mode) from the wireless power receiving device 103 but the setting method is not limited. In operation 703, the wireless power transmitting device 101 may identify information associated with the magnitude of the voltage applied to the transmission coil 213 included in the wireless power transmitting device 101. In operation 705, the wireless power transmitting device 101 may determine whether the peak-to-peak value identified based on the identified information meets a designated condition. For example, as described above, as a determination of whether the designated condition is met, the wireless power transmitting device 101 may identify whether the peak-to-peak value is a predesignated first value or more, but the designated condition is not limited.

If the peak-to-peak value meets the predesignated condition (Yes in 705), according to an embodiment, the wireless power transmitting device 101 may identify the second frequency based on the peak-to-peak value in operation 707. In an example, the wireless power transmitting device 101 may store association information between peak-to-peak and frequency or association information between peak-to-peak and degree of change in frequency. The wireless power transmitting device 101 may identify the second frequency based on the association information and the identified peak-to-peak. In another example, the wireless power transmitting device 101 may calculate the second frequency using Equation 1 and ω when the peak-to-peak value is less than a predesignated value. In another example, the wireless power transmitting device 101 may store an artificial intelligence model that receives at least one input value (e.g., the voltage applied to the transmission coil 213, current, frequency, M, and the value (e.g., $V_{REC}$, $R_L$) measured in the wireless power receiving device) and outputs the frequency, and the input values are not limited thereto. The artificial intelligence model may be, e.g., a reinforcement learning model trained using peak-to-peak values included in a predetermined range as rewards, but the type of the artificial intelligence model is not limited. The reinforcement learning model may be trained with at least one parameter in the reinforcement learning model to allow peak-to-peak values to be included in the predetermined range. The wireless power transmitting device 101 may input at least one input value to the reinforcement learning model and may accordingly identify the second frequency. Meanwhile, it will be appreciated by one of ordinary skill in the art that the method of determining the second frequency) described above are merely examples, and the determining method is not limited. In operation 709, the wireless power transmitting device 101 may output a second control signal for generating AC power of the second frequency to the inverter. Meanwhile, when the peak-to-peak value does not meet the designated condition (No in 705), the wireless power transmitting device 101 may maintain the output of the first control signal in operation 711.

Figure 8A:
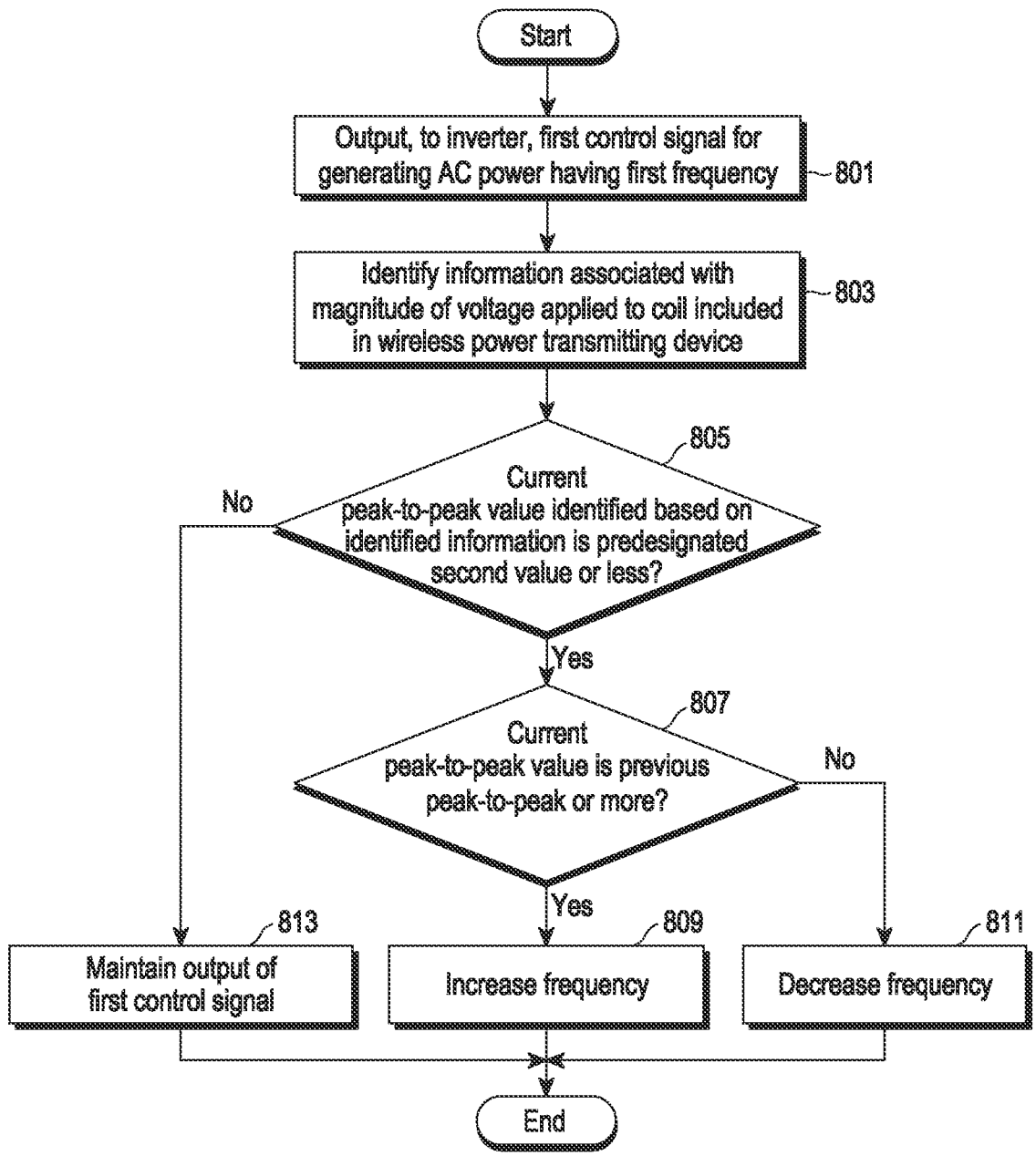
FIG. 8A is a flowchart illustrating an operation method of a wireless power transmitting device according to an embodiment.

FIG. 8A is a flowchart illustrating an operation method of a wireless power transmitting device according to an embodiment.

According to an embodiment, the wireless power transmitting device 101 (e.g., the controller 215) may output a first control signal for controlling at a first frequency, larger than the prior frequency, to the inverter in operation 801. For example, it is assumed that the wireless power transmitting device 101 increases the frequency before performing the embodiment of FIG. 8A for mitigation of audible noise. In operation 803, the wireless power transmitting device 101 may identify information associated with the magnitude of the voltage applied to the coil included in the wireless power transmitting device 101. In operation 805, the wireless power transmitting device 101 may determine whether the current peak-to-peak value identified based on the identified information is a predesignated second value or less. The second predesignated value may be set to correspond to a case where the success rate of ASK decoding is a designated level. For example, as the peak-to-peak value decreases, the success rate of decoding may decrease, so that the wireless power transmitting device 101 may be implemented such that the peak-to-peak value is not reduced to less than a predetermined level, e.g., a predesignated second value.

If the current peak-to-peak value is less than the predesignated second value (Yes in 805), according to an embodiment, the wireless power transmitting device 101 may determine that the current peak-to-peak value is the previous peak-to-peak or more in operation 807. If the current peak-to-peak value is the previous peak-to-peak or more (Yes in 807), the wireless power transmitting device 101 may perform the operation of increasing the frequency in operation 809. That the current peak-to-peak value is greater than the previous peak-to-peak may mean that the peak-to-peak value has been increased, meaning that the current frequency adjustment (i.e., increasing the frequency) has increased the peak-to-peak value. Accordingly, the wireless power transmitting device 101 may maintain the adjustment stance (i.e., increasing the frequency). The degree of change in frequency (e.g., degree of increase) of the wireless power transmitting device 101 may be a change in frequency by a preset size (e.g., about 1.27 kHz), as an example. Or, the degree of change may be determined depending on the initial frequency before the frequency adjustment. For example, if the initial frequency is 127 kHz, and the degree of change is 1%, the wireless power transmitting device 101 may change the frequency by 1.27 kHz which is 1% of 127 kHz in which case the degree of change may be varied depending on the initial frequency.

If the current peak-to-peak value is less than the previous peak-to-peak (No in 807), the wireless power transmitting device 101 may perform the operation of decreasing the frequency in operation 811. That the current peak-to-peak value is less than the previous peak-to-peak may mean that the peak-to-peak value has been decreased, meaning that the current frequency adjustment (i.e., increasing the frequency) has instead decreased the peak-to-peak value. Accordingly, the wireless power transmitting device 101 may stop or reverse the current adjustment stance (i.e., increasing the frequency) to reduce frequency. When the peak-to-peak value is more than a predesignated second value (No in 805), the wireless power transmitting device 101 may maintain the output of the first control signal in operation 813.

Figure 8B:
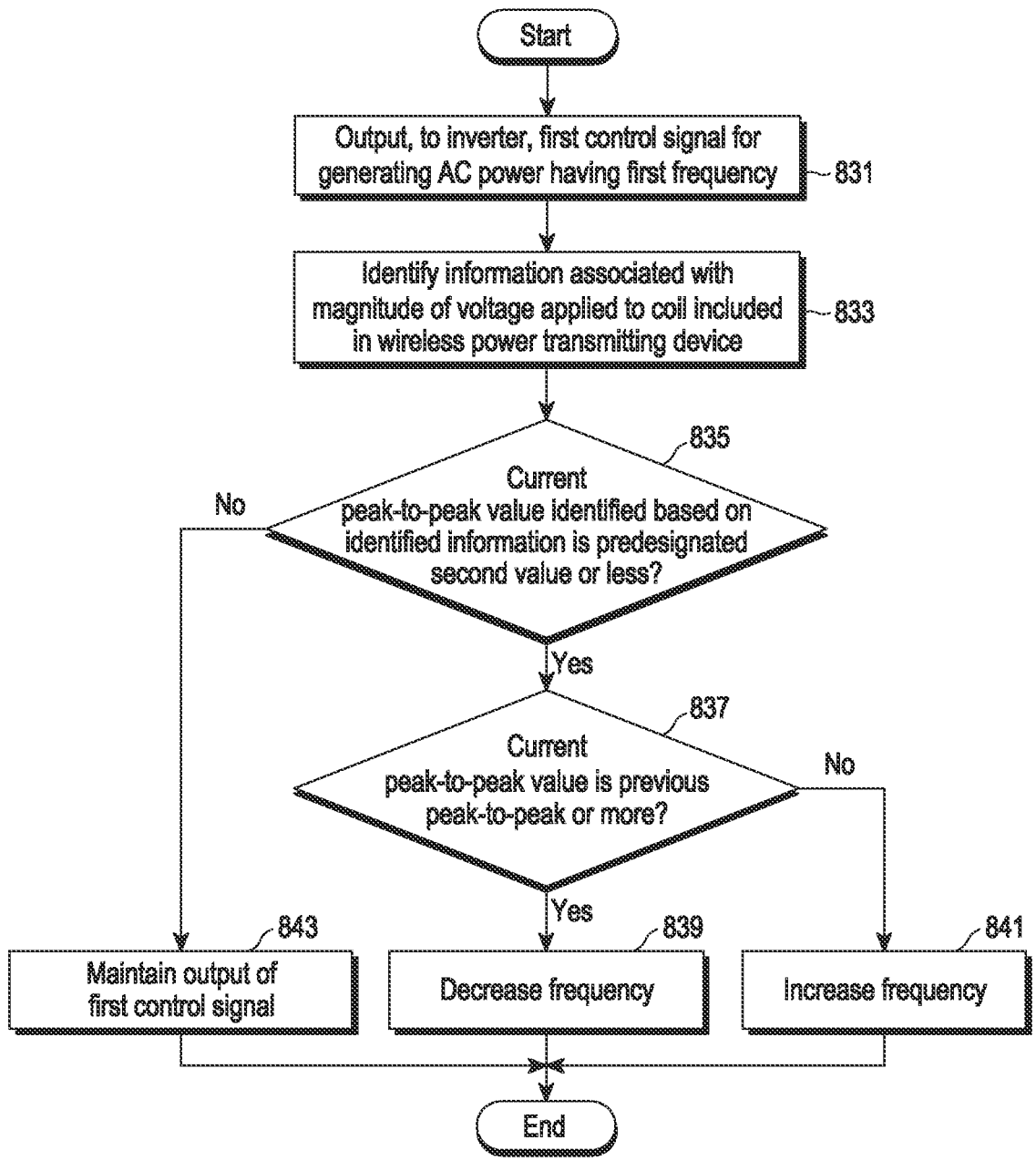
FIG. 8B is a flowchart illustrating an operation method of a wireless power transmitting device according to an embodiment.

FIG. 8B is a flowchart illustrating an operation method of a wireless power transmitting device according to an embodiment.

According to an embodiment, the wireless power transmitting device 101 (e.g., the controller 215) may output a first control signal for controlling at a first frequency, larger than the prior frequency, to the inverter in operation 831. For example, it is assumed that the wireless power transmitting device 101 decreases the frequency before performing the embodiment of FIG. 8B for mitigation of audible noise. In operation 833, the wireless power transmitting device 101 may identify information associated with the magnitude of the voltage applied to the coil included in the wireless power transmitting device 101. In operation 835, the wireless power transmitting device 101 may determine whether the current peak-to-peak value identified based on the identified information is a predesignated second value or less.

If the current peak-to-peak value is less than the predesignated second value (Yes in 835), according to an embodiment, the wireless power transmitting device 101 may determine that the current peak-to-peak value is the previous peak-to-peak or more in operation 837. If the current peak-to-peak value is the previous peak-to-peak or more (Yes in 837), the wireless power transmitting device 101 may perform the operation of decreasing the frequency in operation 839. That the current peak-to-peak value is greater than the previous peak-to-peak may mean that the peak-to-peak value has increased, so that the wireless power transmitting device 101 may maintain the adjustment stance (i.e., decreasing the frequency). If the current peak-to-peak value is less than the previous peak-to-peak (No in 837), the wireless power transmitting device 101 may perform the operation of increasing the frequency in operation 841. That the current peak-to-peak value is less than the previous peak-to-peak may mean that the peak-to-peak value has decreased, so that the wireless power transmitting device 101 may stop or reverse the adjustment stance (i.e., decreasing the frequency) to increase frequency. When the peak-to-peak value is more than a predesignated second value (No in 835), the wireless power transmitting device 101 may maintain the output of the first control signal in operation 843. As described above, the wireless power transmitting device 101 may determine whether to maintain the current frequency change stance depending on the peak-to-peak value before the frequency change and the peak-to-peak value after the frequency change. In another embodiment, the wireless power transmitting device 101 may change the frequency in a default adjustment direction upon changing the initial frequency but the way to change the initial frequency is not limited.

Figure 8C:
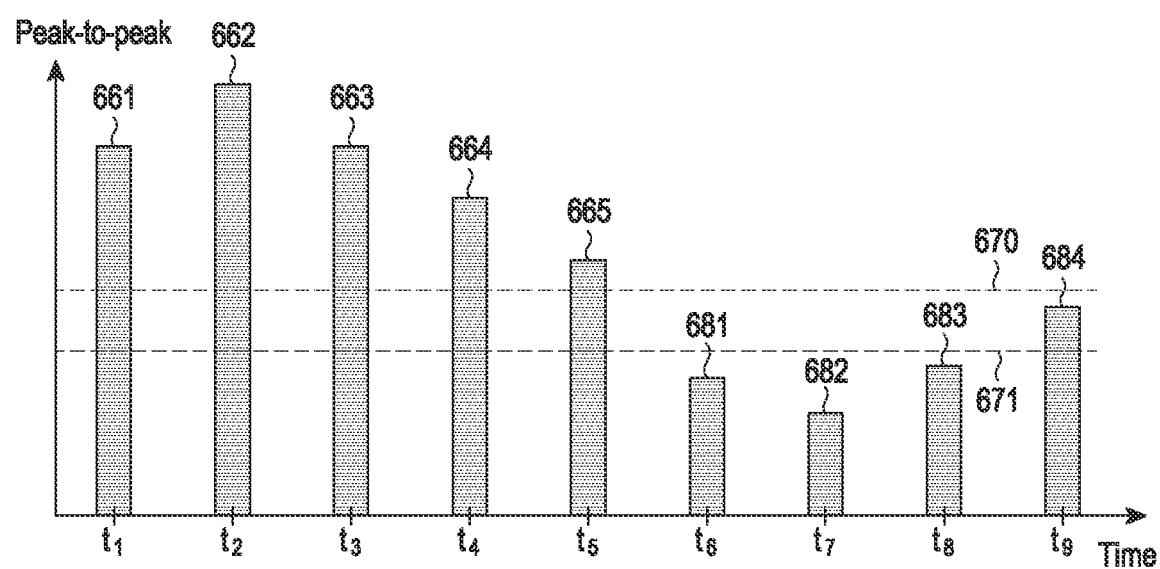
FIG. 8C is a view illustrating a change in peak-to-peak value by frequency adjustment according to an embodiment.

FIG. 8C is a view illustrating a change in peak-to-peak value by frequency adjustment according to an embodiment.

At least some of the operations during the period from the first time t1 to the fifth time t5 in FIG. 8C have been described with reference to FIG. 6C, and no further description thereof is given below. At the fifth time t5, the wireless power transmitting device 101 may reduce the frequency. The wireless power transmitting device 101 may identify a peak-to-peak value 681 at a sixth time t6. The wireless power transmitting device 101 may identify that the peak-to-peak value 681 is the predesignated second value 671 or less at the sixth time t6. Based on the peak-to-peak value 681 being the predesignated second value 671 or less, the wireless power transmitting device 101 may change (e.g., reduce) the frequency. The wireless power transmitting device 101 may identify that the peak-to-peak value 682 is the predesignated second value 671 or less at a seventh time t7. The wireless power transmitting device 101 may identify that the peak-to-peak value 682 after the frequency change (frequency decrease) is smaller than the peak-to-peak value 681 before the frequency change (frequency decrease). The wireless power transmitting device 101 may change the stance of changing frequency based on the peak-to-peak value 682 after the frequency change (frequency decrease) being smaller than the peak-to-peak value 681 before the frequency change (frequency decrease). The wireless power transmitting device 101 may identify that the peak-to-peak value 683 is the predesignated second value 671 or less at an eighth time t8. The wireless power transmitting device 101 may identify that the peak-to-peak value 683 after the frequency change (frequency increase) is larger than the peak-to-peak value 683 before the frequency change (frequency increase). The wireless power transmitting device 101 may maintain the stance of changing frequency based on the peak-to-peak value 683 after the frequency change (frequency increase) being larger than the peak-to-peak value 682 before the frequency change (frequency increase). The wireless power transmitting device 101 may change (frequency increase) the frequency. The wireless power transmitting device 101 may identify that the peak-to-peak value 684 at a ninth time t9 after changing (increasing) the frequency is more than the predesignated second value 671 and may maintain the frequency. When the embodiment according to FIGS. 6A and 6B and the embodiment according to FIGS. 8A and 8B are applied, the wireless power transmitting device 101 may be operated so that the peak-to-peak value is included in a range more than the predesignated second value 671 and not more than the predesignated first value 670. Thus, it is possible to ensure a predetermined level or more of success rate while suppressing audible noise.

Figure 9:
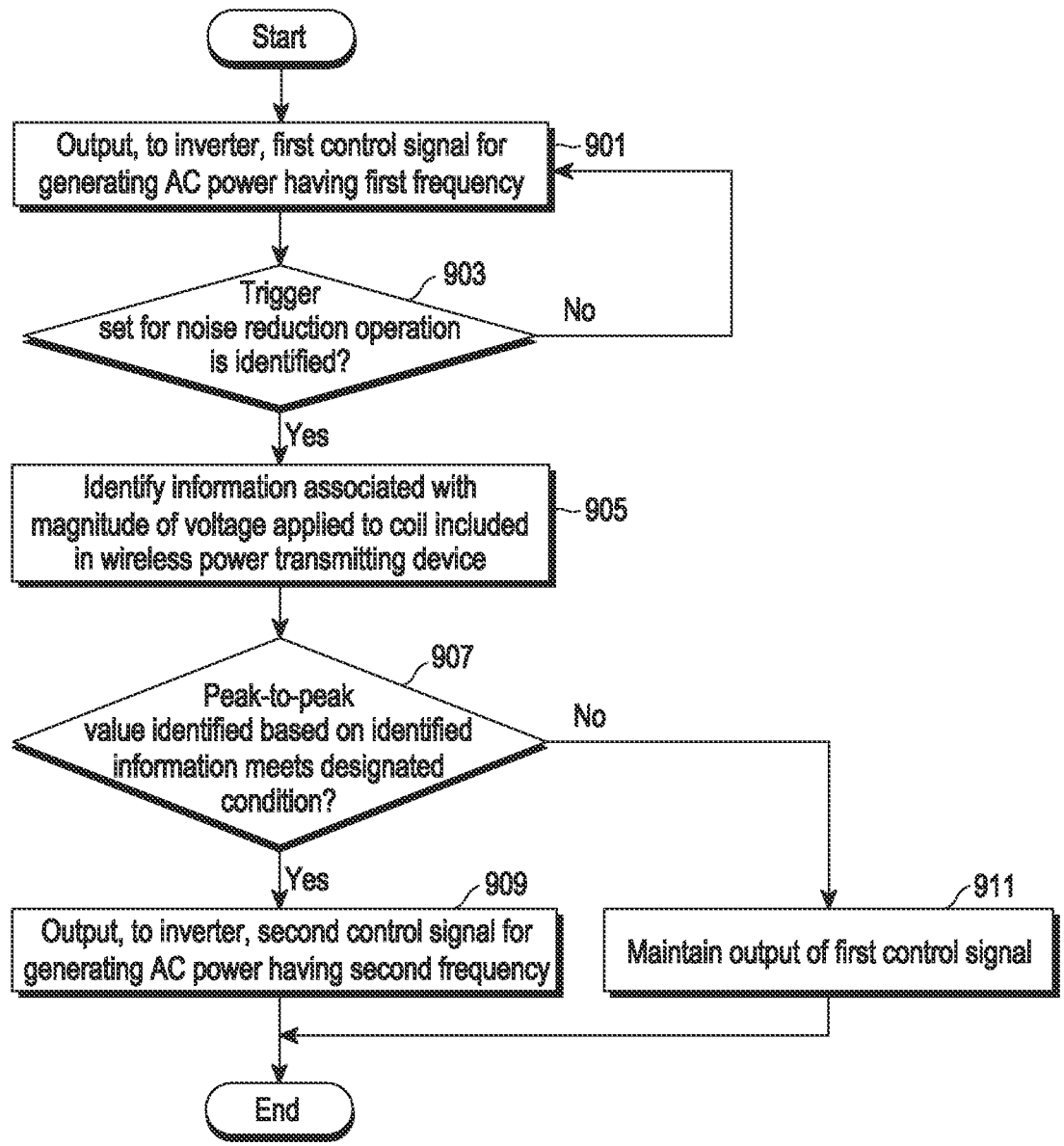
FIG. 9 is a flowchart illustrating an operation method of a wireless power transmitting device according to an embodiment.

FIG. 9 is a flowchart illustrating an operation method of a wireless power transmitting device according to an embodiment.

According to an embodiment, the wireless power transmitting device 101 (e.g., the controller 215) may output a first control signal for generating AC power of a first frequency to the inverter in operation 901. In operation 903, the wireless power transmitting device 101 may identify whether a trigger set for noise reduction operation is identified. In an example, the wireless power transmitting device 101 may identify reception of an audible noise adjust request packet from the wireless power receiving device 103, as the trigger. For example, the user of the wireless power receiving device 103 may manipulate the wireless power receiving device 103 to input an audible noise adjust command. The wireless power receiving device 103 may transmit an audible noise adjust request packet based on the audible noise adjust command input by the user. Or, the wireless power receiving device 103 may identify the magnitude of the audible noise using an included microphone. If the magnitude of the audible noise is a threshold magnitude or more, the wireless power receiving device 103 may transmit the audible noise adjust request packet. The wireless power transmitting device 101 may identify that a trigger has been detected, based on identifying the packet from the wireless power receiving device 103. In another example, the wireless power transmitting device 101 may identify the magnitude of the noise of the ambient environment using the microphone included in the wireless power transmitting device 101 or receive information about the magnitude of the noise of the ambient environment from the wireless power receiving device 103. The wireless power transmitting device 101 may also identify that the trigger has been detected based on the magnitude of noise being included in a designated range. In another example, the wireless power transmitting device 101 may also identify that the trigger has been detected based on the current time being within a designated time range (e.g., nighttime). As described above, the wireless power transmitting device 101 may identify whether the trigger is detected, based on the result of measurement and/or data from the wireless power receiving device 103. In operation 905, the wireless power transmitting device 101 may identify information associated with the magnitude of the voltage applied to the coil included in the wireless power transmitting device 101. In operation 907, the wireless power transmitting device 101 may determine whether the peak-to-peak value identified based on the identified information meets a designated condition. If the peak-to-peak value meets the designated condition (Yes in 907), the wireless power transmitting device 101 may output a second control signal for generating AC power of a second frequency to the inverter in operation 909. When the peak-to-peak value does not meet the designated condition (No in 907), the wireless power transmitting device 101 may maintain the output of the first control signal in operation 911. Or, if the peak-to-peak of, e.g., the magnitude of rectified voltage meets a designated condition, the wireless power receiving device 103 may transmit a trigger signal to the wireless power transmitting device 101. The wireless power transmitting device 101 may output the second control signal for generating AC power of the second frequency to the inverter based on reception of the trigger signal.

Figure 10:
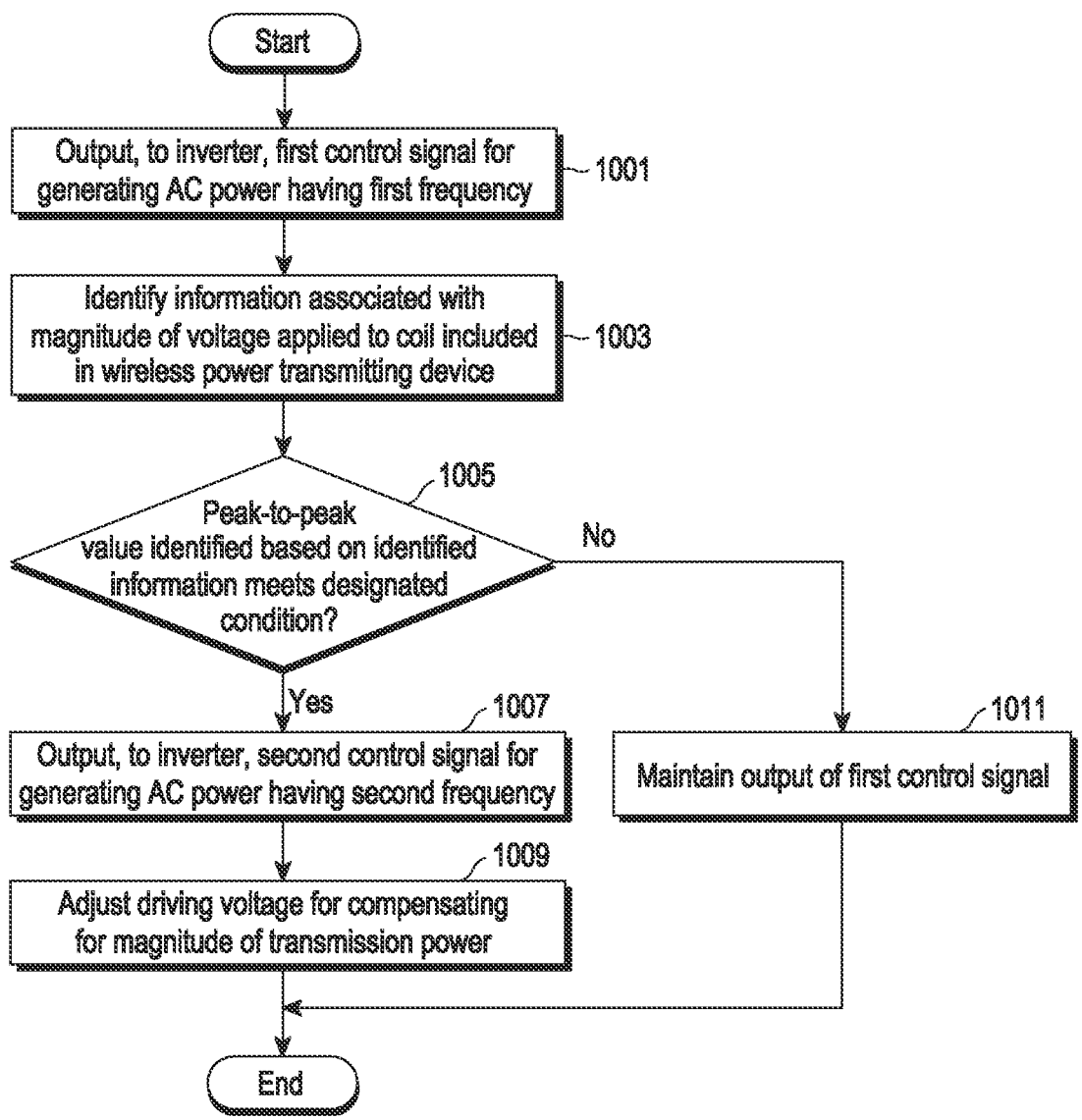
FIG. 10 is a flowchart illustrating an operation method of a wireless power transmitting device according to an embodiment.

FIG. 10 is a flowchart illustrating an operation method of a wireless power transmitting device according to an embodiment.

According to an embodiment, the wireless power transmitting device 101 (e.g., the controller 215) may output a first control signal for generating AC power of a first frequency to the inverter in operation 1001. In operation 1003, the wireless power transmitting device 101 may identify information associated with the magnitude of the voltage applied to the transmission coil 213 included in the wireless power transmitting device 101. In operation 1005, the wireless power transmitting device 101 may identify whether the peak-to-peak value identified based on the identified information meets a designated condition.

If the peak-to-peak value meets the designated condition (Yes in 1005), the wireless power transmitting device 101 may output a second control signal for generating AC power of a second frequency to the inverter in operation 1007. In operation 1009, the wireless power transmitting device 101 may perform adjustment of driving voltage for compensating for the magnitude of transmission power. For example, according to the adjustment of frequency, the magnitude of the power provided from the wireless power transmitting device 101 to the wireless power receiving device 103 may be changed as well. The wireless power transmitting device 101 may adjust the driving voltage $V_{DD}$ output from the DC/DC converter 217 to apply power at the magnitude required by the wireless power receiving device 103. In an example, the wireless power transmitting device 101 may store association information between frequency (or degree of change in frequency) and driving voltage (or degree of change in driving voltage). The wireless power transmitting device 101 may determine the magnitude of the driving voltage based on the stored association information and the changed frequency. Or, the wireless power transmitting device 101 may determine the magnitude of the driving voltage based on calculation or an artificial intelligence model, but the determining method is not limited. Or, the wireless power transmitting device 101 may identify the power adjust request (e.g., CEP) from the wireless power receiving device 103 and, based thereupon, change the driving voltage. When the peak-to-peak value does not meet the designated condition (No in 1005), the wireless power transmitting device 101 may maintain the output of the first control signal in operation 1011.

Figure 11:
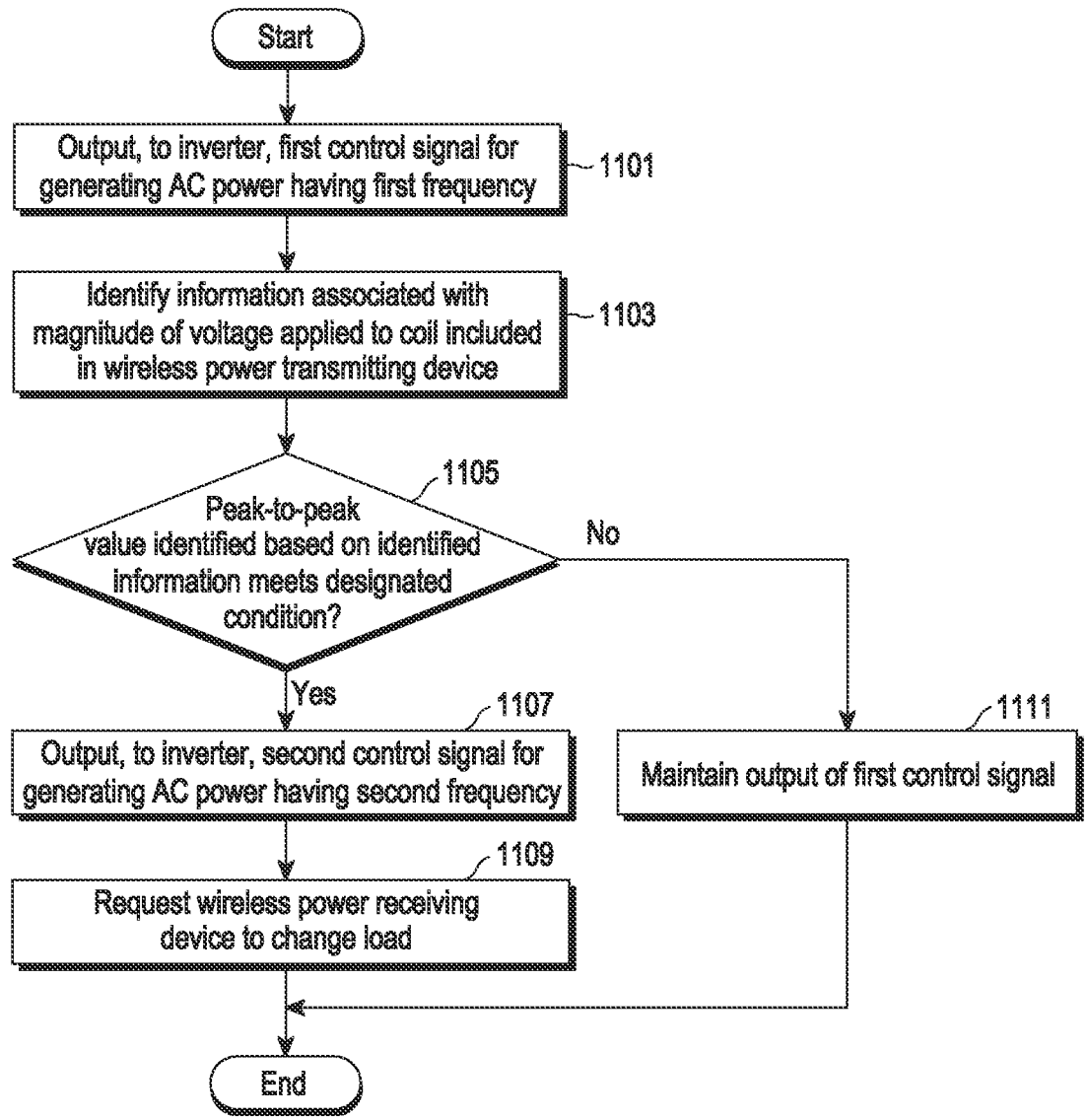
FIG. 11 is a flowchart illustrating an operation method of a wireless power transmitting device according to an embodiment.

FIG. 11 is a flowchart illustrating an operation method of a wireless power transmitting device according to an embodiment.

According to an embodiment, the wireless power transmitting device 101 (e.g., the controller 215) may output a first control signal for generating AC power of a first frequency to the inverter in operation 1101. In operation 1103, the wireless power transmitting device 101 may identify information associated with the magnitude of the voltage applied to the transmission coil 213 included in the wireless power transmitting device 101. In operation 1105, the wireless power transmitting device 101 may identify whether the peak-to-peak value identified based on the identified information meets a designated condition. If the peak-to-peak value meets the designated condition (Yes in 1105), the wireless power transmitting device 101 may output a second control signal for generating AC power of a second frequency to the inverter in operation 1107. In operation 1109, the wireless power transmitting device 101 may request the wireless power receiving device 103 to change the load. In an example, the wireless power transmitting device 101 may provide a packet for requesting to change the load to the wireless power receiving device 103. In another example, the wireless power transmitting device 101 may provide a packet for requesting to increase or decrease the load to the wireless power receiving device 103. In another example, the wireless power transmitting device 101 may provide a packet for requesting to control the on/off state of at least one of the switches 231, 232, 233, and 234 of the wireless power receiving device 103 to the wireless power receiving device 103. It will be appreciated by one of ordinary skill in the art that the packet is not limited thereto as long as the packet causes a change in load in the wireless power receiving device 103. The wireless power receiving device 103 may change the load (e.g., control the on/off state of at least one of the switches 231, 232, 233, and 234 and/or control the output voltage and/or output current of the charger 244) based on reception of the packet but the method for changing the load is not limited. When the peak-to-peak value does not meet the designated condition (No in 1105), the wireless power transmitting device 101 may maintain the output of the first control signal in operation 1111. As described above, the wireless power transmitting device 101 may request the wireless power receiving device 103 to change the load, as well as adjust the operating frequency. As the wireless power receiving device 103 changes the load, the chance of the magnitude of audible noise decreasing may increases as well.

Figure 12:
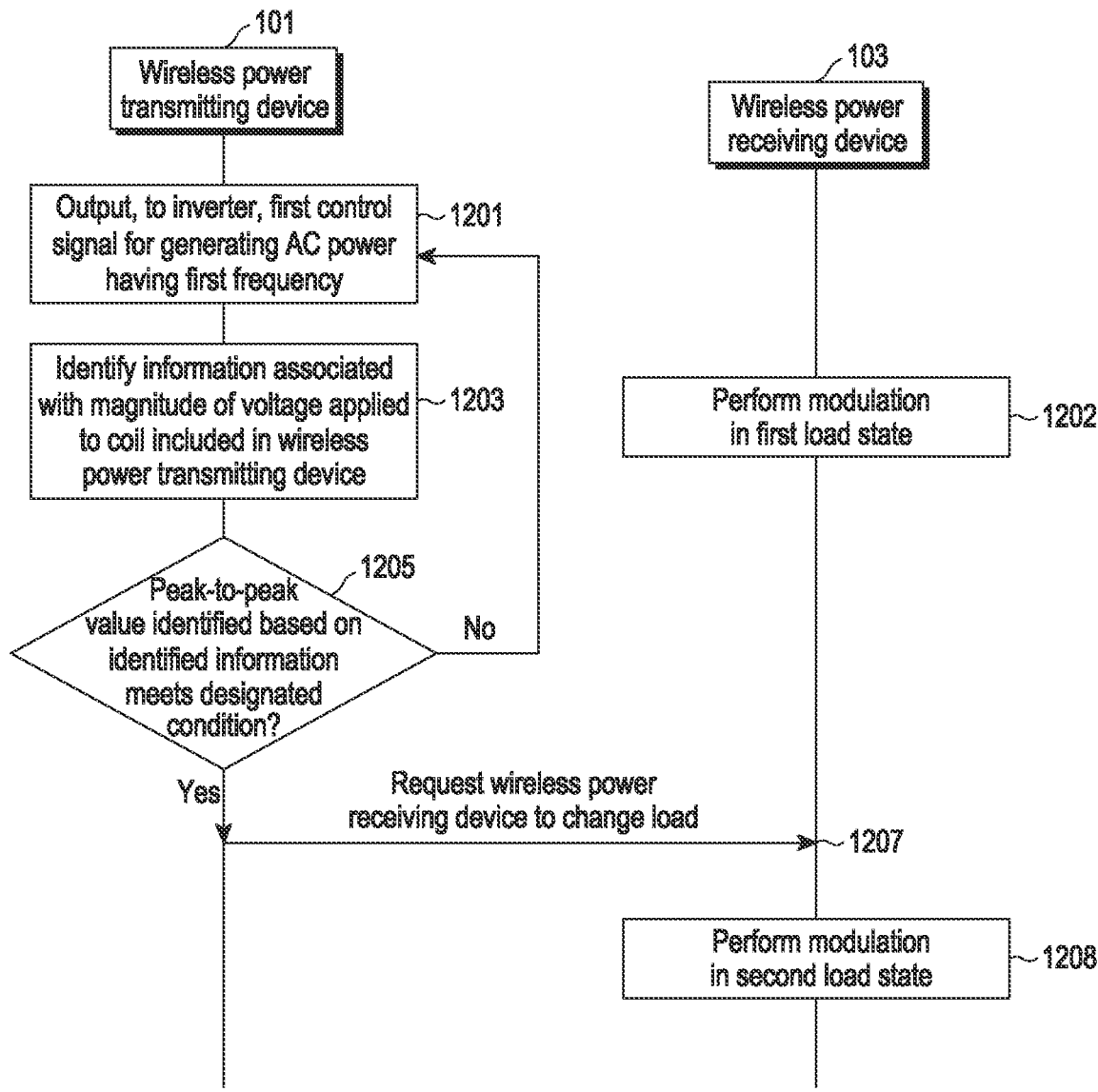
FIG. 12 is a flowchart illustrating an operation method of a wireless power transmitting device and a wireless power receiving device according to an embodiment.

FIG. 12 is a flowchart illustrating an operation method of a wireless power transmitting device and a wireless power receiving device according to an embodiment.

According to an embodiment, the wireless power transmitting device 101 (e.g., the controller 215) may output a first control signal for generating AC power of a first frequency to the inverter in operation 1201. According to an embodiment, in operation 1202, the wireless power receiving device 103 may perform modulation in a first load state. In an example, the wireless power receiving device 103 may use all of the capacitors 261, 262, 263, and 264 for modulation. Accordingly, the wireless power receiving device 103 may perform ASK modulation by turning on/off the switches 231, 232, 233, and 234, and the modulation using all of the capacitors 261, 262, 263, and 264 may be referred to as the first load state. In operation 1203, the wireless power transmitting device 101 may identify information associated with the magnitude of the voltage applied to the transmission coil 213 included in the wireless power transmitting device 101. During these operations, the wireless power receiving device 103 may perform modulation in the first load state. For example, modulation may be performed using all of the switches 231, 232, 233, and 234 in the first load state. In operation 1205, the wireless power transmitting device 101 may identify whether the peak-to-peak value identified based on the identified information meets a designated condition. When the peak-to-peak value does not meet the designated condition (No in 1205), the wireless power transmitting device 101 may maintain the output of the first control signal.

According to an embodiment, if the peak value meets a designated condition (Yes in 1205), the wireless power transmitting device 101 may request the wireless power receiving device 103 to change the load in operation 1207. The wireless power receiving device 103 may perform modulation in a second load state based on reception of the load change request in operation 1208. For example, modulation may be performed using some of the switches 231, 232, 233, and 234 in the second load state. As the load in the wireless power receiving device 103 is changed, the peak-to-peak value of the voltage at at least one capacitor of the wireless power transmitting device 101 may be decreased. If the peak-to-peak value rather increases, the wireless power transmitting device 101 may request the wireless power receiving device 103 to change the load again. Or, if the peak-to-peak value meets a designated condition even after the load is changed, the wireless power transmitting device 101 may request the wireless power receiving device 103 to change the load again. In an example, the wireless power receiving device 103 may modulate the packet to indicate that load change is not possible any longer. The wireless power transmitting device 101 may be configured to change the operating frequency based on identifying the packet.

Meanwhile, although not shown, the wireless power transmitting device 101 may also identify that the peak-to-peak is a second threshold or less. In this case, the wireless power transmitting device 101 may request the wireless power receiving device 103 to change the load so that the success rate of decoding may maintain a designated level or more.

Figure 13:
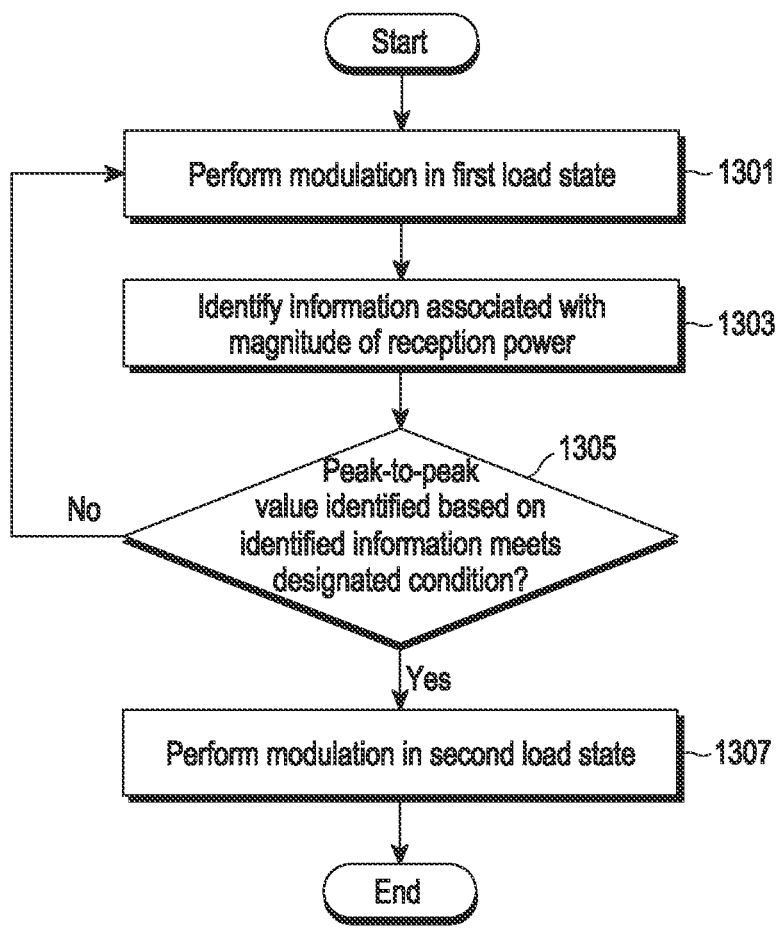
FIG. 13 is a flowchart illustrating an operation method of a wireless power receiving device according to an embodiment.

FIG. 13 is a flowchart illustrating an operation method of a wireless power receiving device according to an embodiment.

According to an embodiment, in operation 1301, the wireless power receiving device 103 (e.g., the controller 250) may perform modulation in a first load state. In an example, the wireless power receiving device 103 may use all of the capacitors 261, 262, 263, and 264 for modulation. Accordingly, the wireless power receiving device 103 may perform ASK modulation by turning on/off the switches 231, 232, 233, and 234, and the modulation using all of the capacitors 261, 262, 263, and 264 may be referred to as the first load state.

According to an embodiment, in operation 1303, the wireless power receiving device 103 may identify information associated with the magnitude of reception power. In an example, the wireless power receiving device 103 may identify the voltage applied to the reception coil 221 as the information associated with the magnitude of reception power. Or, the wireless power receiving device 103 may identify information resultant from processing (e.g., filtering) the voltage applied to the reception coil 221 as the information associated with the magnitude of reception power. Or, the wireless power receiving device 103 may identify the voltage applied to the output end of the rectification circuit 255 as the information associated with the magnitude of reception power. Or, the wireless power receiving device 103 may identify the voltage applied to the output end of the regulator 242 as the information associated with the magnitude of reception power, but the information associated with the magnitude of the reception power is not limited. Further, the wireless power receiving device 103 may include a sensor capable of measuring voltage at various points as described above. Meanwhile, the wireless power receiving device 103 may identify at least one of current, power, or impedance, in addition to voltage (or as alternative to voltage), as the information associated with the magnitude of reception power.

According to an embodiment, in operation 1305, the wireless power receiving device 103 may identify whether the peak-to-peak value identified based on the identified information meets a designated condition. According to the modulation in the first load state, a ripple corresponding to the modulation frequency may be generated in the identified information. The wireless power receiving device 103 may identify the peak-to-peak value of the ripple corresponding to the modulation frequency. For example, the wireless power receiving device 103 may identify the difference between the voltage value when the switches 231, 232, 233, and 234 are in the on state and the value when the switches 231, 232, 233, and 234 are in the off state, as the peak-to-peak value. The wireless power receiving device 103 may identify whether the peak-to-peak value meets a designated condition indicating that the audible noise is a designated magnitude or more. For example, the designated condition may include at least some of at least one condition described in connection with the wireless power transmitting device 101, but is not limited.

According to an embodiment, if the peak-to-peak value meets the designated condition (Yes in 1305), the wireless power receiving device 103 may perform modulation in the second load state in operation 1307. For example, the wireless power receiving device 103 may perform modulation using two capacitors 261 and 261 instead of the four capacitors 261, 262, 263, and 264. However, the reduction in the number of capacitors for modulation is merely an example, and examples of changing capacitors are not limited. Or, the wireless power receiving device 103 may adjust $R_L$ in Equation 2 by adjusting the voltage and/or current at the output end of the regulator 242. Accordingly, the peak-to-peak may be reduced, and the magnitude of audible noise may be decreased. On the other hand, if the designated is not met (No in 1305), the wireless power receiving device 103 may maintain the modulation in the first load state.

Figure 14:
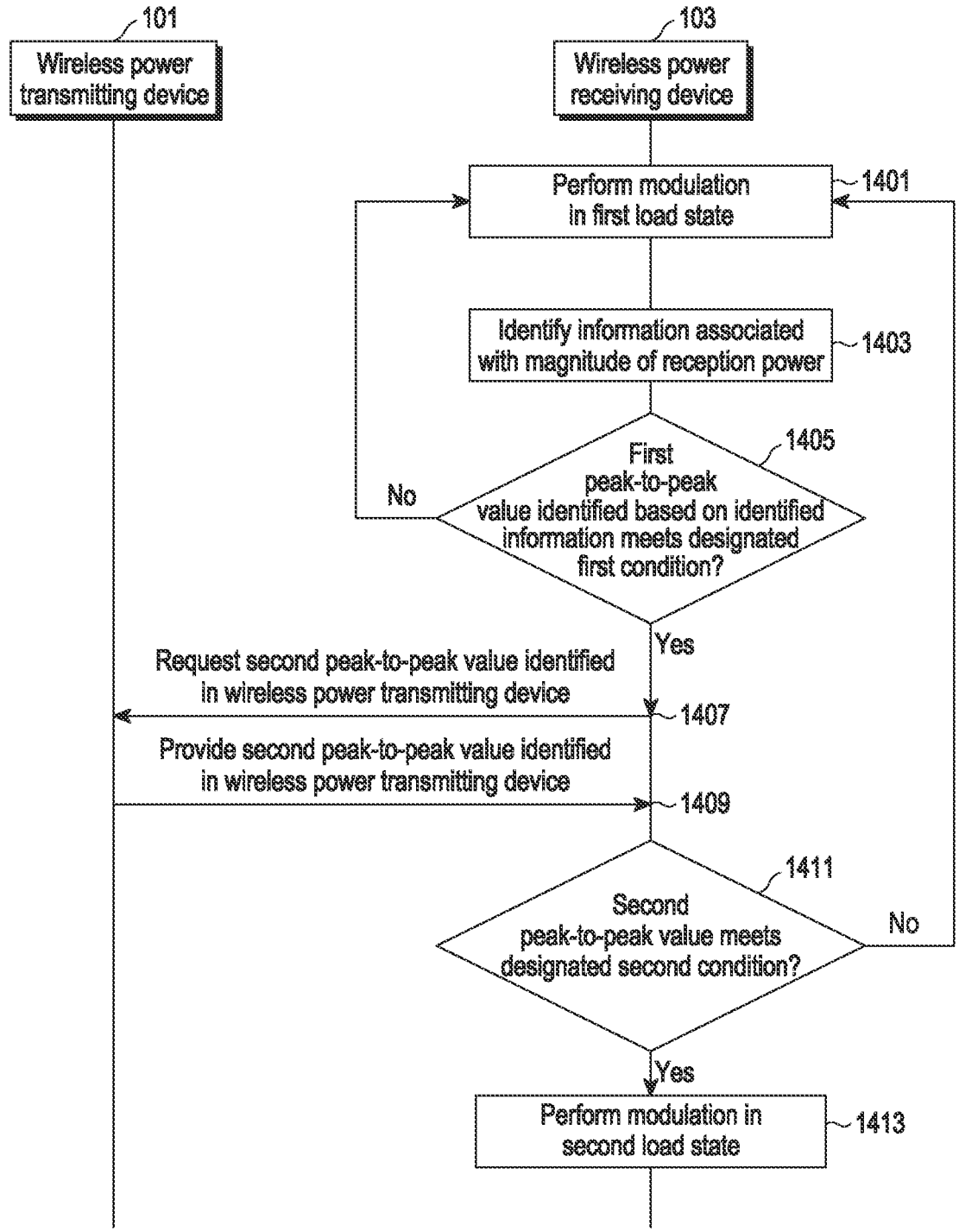
FIG. 14 is a flowchart illustrating an operation method of a wireless power receiving device according to an embodiment.

FIG. 14 is a flowchart illustrating an operation method of a wireless power receiving device according to an embodiment.

According to an embodiment, in operation 1401, the wireless power receiving device 103 (e.g., the controller 250) may perform modulation in a first load state. In operation 1403, the wireless power receiving device 103 may identify information associated with the magnitude of reception power. In operation 1405, the wireless power receiving device 103 may identify whether the first peak-to-peak value identified based on the identified information meets a designated first condition. For example, the first peak-to-peak value may include at least one of the various peak-to-peak values described with reference to FIG. 13. For example, the first condition may be the designated condition described with reference to FIG. 13.

According to an embodiment, in operation 1407, the wireless power receiving device 103 may request a second peak-to-peak value identified by the wireless power transmitting device 101. For example, the second peak-to-peak value may include at least one of the various peak-to-peak values identified by the wireless power transmitting device 101 as described with reference to FIG. 5A. In operation 1409, the wireless power transmitting device 101 may provide the second peak-to-peak value identified by the wireless power transmitting device 101 to the wireless power receiving device 103. In operation 1411, the wireless power receiving device 103 may identify whether the second peak-to-peak value meets a designated second condition. Here, the second condition may be a condition that may guarantee that the decoding success rate in the wireless power transmitting device 101 is a designated value or more. For example, if the wireless power receiving device 103 performs an operation for reducing the peak-to-peak value, the peak-to-peak value in the wireless power transmitting device 101 would also be decreased. However, if the peak-to-peak value of the wireless power transmitting device 101 is too low, it may also mean that the success rate of decoding may be below a designated value. Accordingly, before performing the operation for reducing the peak-to-peak value, the wireless power receiving device 103 may identify whether the second condition associated with whether the wireless power transmitting device 101 is able to successfully perform decoding is met. If the second condition is met (Yes in 1411), the wireless power receiving device 103 may perform modulation in the second load state in operation 1413. If the second condition is not met (No in 1411), the wireless power receiving device 103 may maintain modulation in the first load state.

According to an embodiment, the wireless power receiving device 103 may determine the second load state based on the second peak-to-peak value from the wireless power transmitting device 101. For example, if the second peak-to-peak value is identified to be relatively large, the wireless power receiving device 103 may determine the second load state to be able to relatively significantly reduce the first peak-to-peak value and/or the second peak-to-peak value. For example, if the second peak-to-peak value is identified to be relatively small, the wireless power receiving device 103 may determine the second load state to be able to relatively significantly increase the first peak-to-peak value and/or the second peak-to-peak value.

Figure 15:
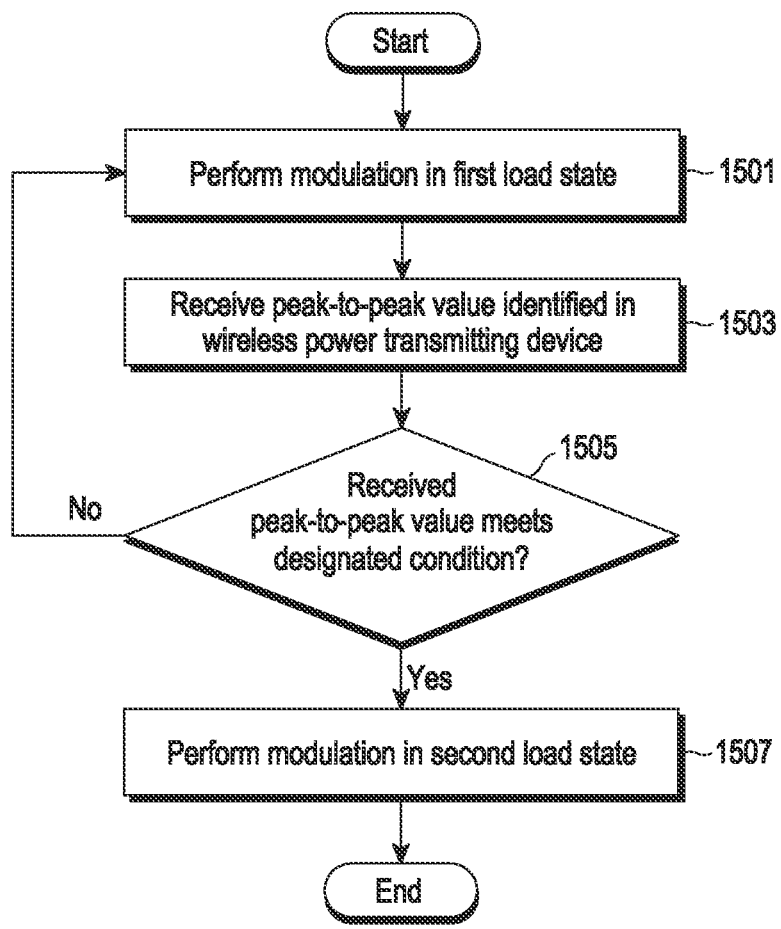
FIG. 15 is a flowchart illustrating an operation method of a wireless power receiving device according to an embodiment.

FIG. 15 is a flowchart illustrating an operation method of a wireless power receiving device according to an embodiment.

According to an embodiment, in operation 1501, the wireless power receiving device 103 (e.g., the controller 250) may perform modulation in a first load state. In operation 1503, the wireless power receiving device 103 may receive the peak-to-peak value identified in the wireless power transmitting device 101. In an example, the wireless power receiving device 103 may request the peak-to-peak value from the wireless power transmitting device 101 and, in response to the request, receive the peak-to-peak value. Or, the wireless power transmitting device 101 may be configured to periodically or aperiodically provide the peak-to-peak value to the wireless power receiving device 103. For example, the peak-to-peak value may include at least one of the various peak-to-peak values identified by the wireless power transmitting device 101 as described with reference to FIG. 5A. In operation 1505, the wireless power receiving device 103 may identify whether the received peak-to-peak value meets a designated condition. Here, the designated condition may be a condition set to reduce the peak-to-peak value and may include at least some of various conditions as described above. Based on meeting the designated condition (Yes in 1505), the wireless power receiving device 103 may perform modulation in the second load state in operation 1507. If the designated is not met (No in 1505), the wireless power receiving device 103 may maintain the modulation in the first load state.

An electronic device 1601 which is an example of the wireless power transmitting device 101 and/or the wireless power receiving device 103 is described below with reference to FIG. 16.

Figure 16:
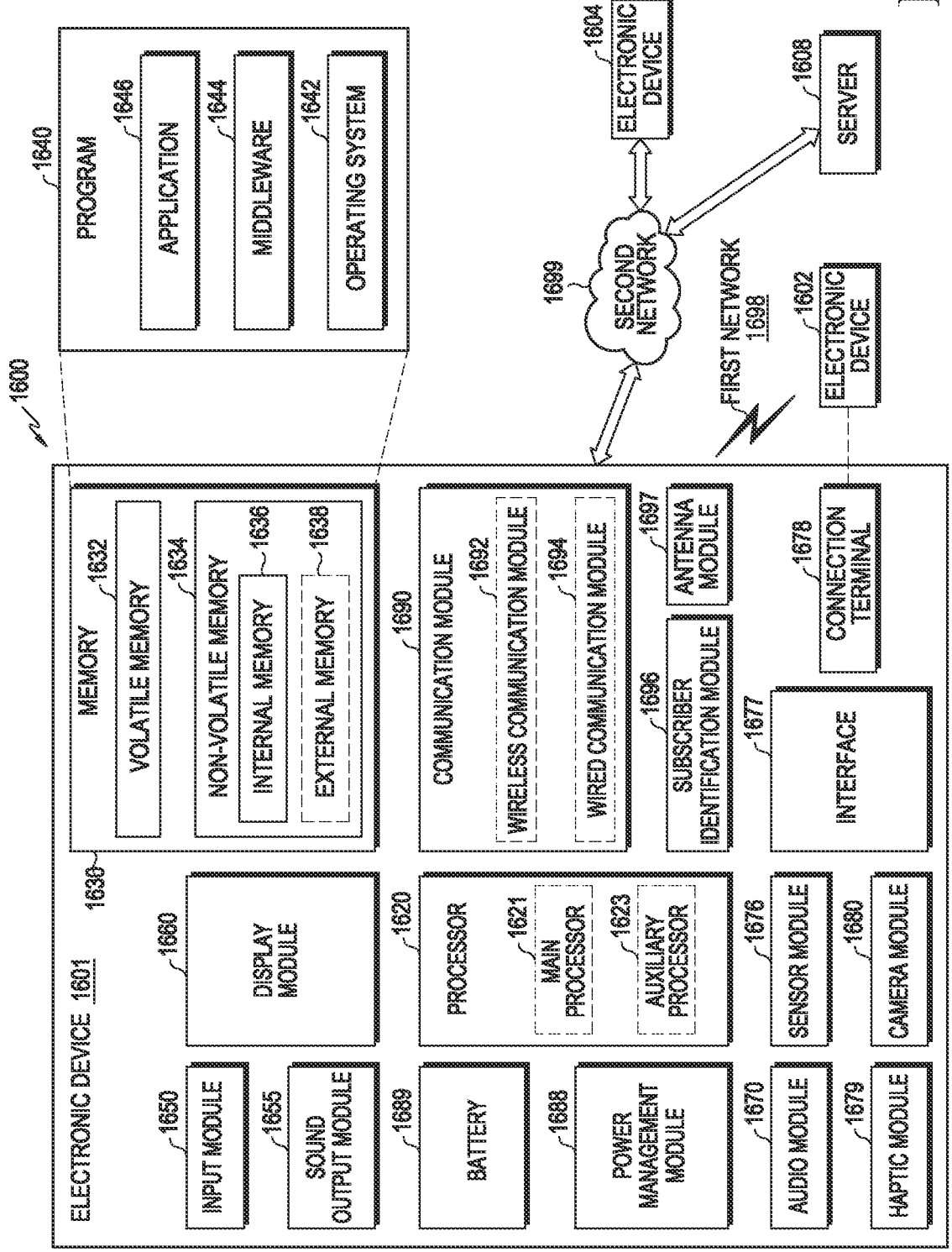
FIG. 16 is a block diagram illustrating an electronic device 1601 in a network environment 1600 according to an embodiment.

FIG. 16 is a block diagram illustrating an electronic device 1601 in a network environment 1600 according to an embodiment. Referring to FIG. 16, the electronic device 1601 in the network environment 1600 may communicate with an electronic device 1602 (e.g., the external electronic device 1603) via a first network 1698 (e.g., a short-range wireless communication network), or an electronic device 1604 or a server 1608 via a second network 1699 (e.g., a long-range wireless communication network). According to an embodiment, the electronic device 1601 may communicate with the electronic device 1604 via the server 1608. According to an embodiment, the electronic device 1601 may include a processor 1620, memory 1630, an input module 1650, a sound output module 1655, a display module 1660, an audio module 1670, a sensor module 1676, an interface 1677, a connecting terminal 1678, a haptic module 1679, a camera module 1680, a power management module 1688, a battery 1689, a communication module 1690, a subscriber identification module (SIM) 1696, or an antenna module 1697. In some embodiments, at least one (e.g., the connecting terminal 1678) of the components may be omitted from the electronic device 1601, or one or more other components may be added in the electronic device 101. According to an embodiment, some (e.g., the sensor module 1676, the camera module 1680, or the antenna module 1697) of the components may be integrated into a single component (e.g., the display module 1660).

The processor 1620 may execute, for example, software (e.g., a program 1640) to control at least one other component (e.g., a hardware or software component) of the electronic device 1601 coupled with the processor 1620, and may perform various data processing or computation. According to one embodiment, as at least part of the data processing or computation, the processor 1620 may store a command or data received from another component (e.g., the sensor module 1676 or the communication module 1690) in volatile memory 1632, process the command or the data stored in the volatile memory 1632, and store resulting data in non-volatile memory 1634. According to an embodiment, the processor 1620 may include a main processor 1621 (e.g., a central processing unit (CPU) or an application processor (AP)), or an auxiliary processor 1623 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 1601 includes the main processor 1621 and the auxiliary processor 1623, the auxiliary processor 1623 may be configured to use lower power than the main processor 1621 or to be specified for a designated function. The auxiliary processor 1623 may be implemented as separate from, or as part of the main processor 1621.

The auxiliary processor 1623 may control at least some of functions or states related to at least one component (e.g., the display module 1660, the sensor module 1676, or the communication module 1690) among the components of the electronic device 1601, instead of the main processor 1621 while the main processor 1621 is in an inactive (e.g., sleep) state, or together with the main processor 1621 while the main processor 1621 is in an active state (e.g., executing an application). According to an embodiment, the auxiliary processor 1623 (e.g., an image signal processor or a communication processor) may be implemented as part of another component (e.g., the camera module 1680 or the communication module 1690) functionally related to the auxiliary processor 123. According to an embodiment, the auxiliary processor 1623 (e.g., the neural processing unit) may include a hardware structure specified for artificial intelligence model processing. The artificial intelligence model may be generated via machine learning. Such learning may be performed, e.g., by the electronic device 1601 where the artificial intelligence is performed or via a separate server (e.g., the server 1608). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1630 may store various data used by at least one component (e.g., the processor 1620 or the sensor module 1676) of the electronic device 1601. The various data may include, for example, software (e.g., the program 1640) and input data or output data for a command related thereto. The memory 1630 may include the volatile memory 1632 or the non-volatile memory 1634.

The program 1640 may be stored in the memory 1630 as software, and may include, for example, an operating system (OS) 1642, middleware 1644, or an application 1646.

The input module 1650 may receive a command or data to be used by other component (e.g., the processor 1620) of the electronic device 1601, from the outside (e.g., a user) of the electronic device 1601. The input module 1650 may include, for example, a microphone, a mouse, a keyboard, keys (e.g., buttons), or a digital pen (e.g., a stylus pen).

The sound output module 1655 may output sound signals to the outside of the electronic device 1601. The sound output module 1655 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1660 may visually provide information to the outside (e.g., a user) of the electronic device 1601. The display 1660 may include, for example, a display, a hologram device, or a projector and control circuitry to control a corresponding one of the display, hologram device, and projector. According to an embodiment, the display 1660 may include a touch sensor configured to detect a touch, or a pressure sensor configured to measure the intensity of a force generated by the touch.

The audio module 1670 may convert a sound into an electrical signal and vice versa. According to an embodiment, the audio module 1670 may obtain the sound via the input module 1650, or output the sound via the sound output module 1655 or a headphone of an external electronic device (e.g., the electronic device 1602 (e.g., the external electronic device 1603)) (e.g., a speaker or headphone) directly or wirelessly coupled with the electronic device 1601.

The sensor module 1676 may detect an operational state (e.g., power or temperature) of the electronic device 1601 or an environmental state (e.g., a state of a user) external to the electronic device 101, and then generate an electrical signal or data value corresponding to the detected state. According to an embodiment, the sensor module 1676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1677 may support one or more specified protocols to be used for the electronic device 1601 to be coupled with the external electronic device (e.g., the electronic device 1602 (e.g., the external electronic device 1603)) directly or wirelessly. According to an embodiment, the interface 1677 may include, for example, a high definition multimedia interface (HDMI), a universal serial bus (USB) interface, a secure digital (SD) card interface, or an audio interface.

A connecting terminal 1678 may include a connector via which the electronic device 1601 may be physically connected with the external electronic device (e.g., the electronic device 1602 (e.g., the external electronic device 1603)). According to an embodiment, the connecting terminal 1678 may include, for example, a HDMI connector, a USB connector, a SD card connector, or an audio connector (e.g., a headphone connector).

The haptic module 1679 may convert an electrical signal into a mechanical stimulus (e.g., a vibration or motion) or electrical stimulus which may be recognized by a user via his tactile sensation or kinesthetic sensation. According to an embodiment, the haptic module 1679 may include, for example, a motor, a piezoelectric element, or an electric stimulator.

The camera module 1680 may capture a still image or moving images. According to an embodiment, the camera module 1680 may include one or more lenses, image sensors, image signal processors, or flashes.

The power management module 1688 may manage power supplied to the electronic device 1601. According to one embodiment, the power management module 1688 may be implemented as at least part of, for example, a power management integrated circuit (PMIC).

The battery 1689 may supply power to at least one component of the electronic device 1601. According to an embodiment, the battery 1689 may include, for example, a primary cell which is not rechargeable, a secondary cell which is rechargeable, or a fuel cell.

The communication module 1690 may support establishing a direct (e.g., wired) communication channel or a wireless communication channel between the electronic device 1601 and the external electronic device (e.g., the electronic device 1602 (e.g., the external electronic device 1603), the electronic device 1604, or the server 1608) and performing communication via the established communication channel. The communication module 1690 may include one or more communication processors that are operable independently from the processor 1620 (e.g., the application processor (AP)) and supports a direct (e.g., wired) communication or a wireless communication. According to an embodiment, the communication module 1690 may include a wireless communication module 1692 (e.g., a cellular communication module, a short-range wireless communication module, or a global navigation satellite system (GNSS) communication module) or a wired communication module 1694 (e.g., a local area network (LAN) communication module or a power line communication (PLC) module). A corresponding one of these communication modules may communicate with the external electronic device 1604 via a first network 1698 (e.g., a short-range communication network, such as Bluetooth™, wireless-fidelity (Wi-Fi) direct, or infrared data association (IrDA)) or a second network 1699 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 1692 may identify or authenticate the electronic device 1601 in a communication network, such as the first network 1698 or the second network 1699, using subscriber information (e.g., international mobile subscriber identity (IMSI)) stored in the subscriber identification module 1696.

The wireless communication module 1692 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1692 may support a high-frequency band (e.g., the mmWave band) to achieve, e.g., a high data transmission rate. The wireless communication module 1692 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1692 may support various requirements specified in the electronic device 1601, an external electronic device (e.g., the electronic device 1604), or a network system (e.g., the second network 1699). According to an embodiment, the wireless communication module 1692 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1697 may transmit or receive a signal or power to or from the outside (e.g., the external electronic device). According to an embodiment, the antenna module 1697 may include one antenna including a radiator formed of a conductor or conductive pattern formed on a substrate (e.g., a printed circuit board (PCB)). According to an embodiment, the antenna module 1697 may include a plurality of antennas (e.g., an antenna array). In this case, at least one antenna appropriate for a communication scheme used in a communication network, such as the first network 1698 or the second network 1699, may be selected from the plurality of antennas by, e.g., the communication module 1690. The signal or the power may then be transmitted or received between the communication module 1690 and the external electronic device via the selected at least one antenna. According to an embodiment, other parts (e.g., radio frequency integrated circuit (RFIC)) than the radiator may be further formed as part of the antenna module 1697.

According to various embodiments, the antenna module 1697 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1601 and the external electronic device 1604 via the server 1608 coupled with the second network 1699. The external electronic devices 1602 or 1604 each may be a device of the same or a different type from the electronic device 1601. According to an embodiment, all or some of operations to be executed at the electronic device 1601 may be executed at one or more of the external electronic devices 1602, 1604, or 1608. For example, if the electronic device 1601 should perform a function or a service automatically, or in response to a request from a user or another device, the electronic device 1601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1601. The electronic device 1601 may provide the outcome, with or without further processing of the outcome, as at least part of a reply to the request. To that end, a cloud computing, distributed computing, mobile edge computing (MEC), or client-server computing technology may be used, for example. The electronic device 1601 may provide ultra low-latency services using, e.g., distributed computing or mobile edge computing. In another embodiment, the external electronic device 1604 may include an Internet-of-things (IoT) device. The server 1608 may be an intelligent server using machine learning and/or a neural network. According to an embodiment, the external electronic device 1604 or the server 1608 may be included in the second network 1699. The electronic device 1601 may be applied to intelligent services (e.g., smart home, smart city, smart car, or healthcare) based on 5G communication technology or IoT-related technology.

According to an embodiment, a wireless power transmitting device (e.g., the wireless power transmitting device 101) may comprise a transmission coil (e.g., the transmission coil 213), a DC/DC converter (e.g., the DC/DC converter 217) configured to output a driving voltage, an inverter (e.g., the inverter 218) configured to output AC power to the transmission coil (e.g., the transmission coil 213), using the driving voltage, and a controller (e.g., the controller 215). The controller (e.g., the controller 215) may be configured to output a first control signal for generating the AC power having a first frequency to the inverter (e.g., the inverter 218), wherein the inverter (e.g., the inverter 218) outputs, to the transmission coil (e.g., the transmission coil 213), the AC power having the first frequency based on the first control signal, measure a demodulated voltage generated by demodulating a signal applied to the transmission coil (e.g., the transmission coil 213) while the AC power having the first frequency is applied to the transmission coil (e.g., the transmission coil 213), and output, to the inverter (e.g., the inverter 218), a second control signal for generating the AC power having a second frequency different from the first frequency, instead of the first control signal, based on a first peak-to-peak value identified in the demodulated voltage being a preset first value or more. The inverter (e.g., the inverter 218) may output the AC power having the second frequency to the transmission coil (e.g., the transmission coil 213) based on the second control signal.

According to an embodiment, the wireless power transmitting device (e.g., the wireless power transmitting device 101) may further comprise a demodulation circuit (e.g., the demodulation circuit 214) configured to perform demodulation on the signal applied to the transmission coil (e.g., the transmission coil 213).

According to an embodiment, the demodulation circuit (e.g., the demodulation circuit 214) may be further configured to perform low-pass filtering on the demodulated voltage.

According to an embodiment, the controller (e.g., the controller 215) may be configured to, as at least part of outputting the second control signal, when a third frequency which is a frequency of the AC power before the first control signal is outputted is smaller than the first frequency, identify the second frequency to be larger than the first frequency, based on the first peak-to-peak value being less than or equal to a second peak-to-peak value identified while the AC power having the third frequency is applied to the transmission coil (e.g., the transmission coil 213), and identify the second frequency to be smaller than the first frequency, based on the first peak-to-peak value being more than the second peak-to-peak value identified while the AC power having the third frequency is applied to the transmission coil (e.g., the transmission coil 213).

According to an embodiment, the controller (e.g., the controller 215) may be configured to, as at least part of outputting the second control signal, when a third frequency which is a frequency of the AC power before the first control signal is outputted is larger than the first frequency, identify the second frequency to be smaller than the first frequency, based on the first peak-to-peak value being less than or equal to a second peak-to-peak value identified while the AC power having the third frequency is applied to the transmission coil (e.g., the transmission coil 213), and identify the second frequency to be larger than the first frequency, based on the first peak-to-peak value being more than the second peak-to-peak value identified while the AC power having the third frequency is applied to the transmission coil (e.g., the transmission coil 213).

According to an embodiment, the controller (e.g., the controller 215) may be configured to, as at least part of outputting the second control signal, identify the second frequency, based on the first peak-to-peak value.

According to an embodiment, the controller (e.g., the controller 215) may be configured to control the first peak-to-peak value so that the first peak-to-peak value is more than a predesignated second value.

According to an embodiment, the controller (e.g., the controller 215) may be configured to, as at least part of outputting the second control signal, output, to the inverter (e.g., the inverter 218), the second control signal for generating the AC power having the second frequency, based on detection of a trigger for a noise reduction operation.

According to an embodiment, the controller (e.g., the controller 215) may be further configured to control the DC/DC converter (e.g., the DC/DC converter 217) to adjust the driving voltage, based on outputting, to the inverter (e.g., the inverter 218), the second control signal for generating the AC power having the second frequency.

According to an embodiment, the controller (e.g., the controller 215) may be further configured to perform modulation to request a wireless power receiving device to change a load, based on the first peak-to-peak value being greater than or equal to the preset first value.

According to an embodiment, a method for operating a wireless power transmitting device (e.g., the wireless power transmitting device 101) including a transmission coil (e.g., the transmission coil 213), a DC/DC converter (e.g., the DC/DC converter 217) configured to output a driving voltage, an inverter (e.g., the inverter 218) configured to output AC power to the transmission coil (e.g., the transmission coil 213) using the driving voltage, and a controller (e.g., the controller 215) may comprise outputting, by the controller (e.g., the controller 215), a first control signal for generating the AC power having a first frequency to the inverter (e.g., the inverter 218), wherein the inverter (e.g., the inverter 218) outputs, to the transmission coil (e.g., the transmission coil 213), the AC power having the first frequency based on the first control signal, measuring, by the controller (e.g., the controller 215), a demodulated voltage generated by demodulating a signal applied to the transmission coil (e.g., the transmission coil 213) while the AC power having the first frequency is applied to the transmission coil (e.g., the transmission coil 213), and outputting, by the controller (e.g., the controller 215), to the inverter (e.g., the inverter 218), a second control signal for generating the AC power having a second frequency different from the first frequency, instead of the first control signal, based on a first peak-to-peak value identified in the demodulated voltage being a preset first value or more. The inverter (e.g., the inverter 218) may output the AC power having the second frequency to the transmission coil (e.g., the transmission coil 213) based on the second control signal.

According to an embodiment, the wireless power transmitting device (e.g., the wireless power transmitting device 101) may further comprise a demodulation circuit (e.g., the demodulation circuit 214) configured to perform demodulation on the signal. The method for operating the wireless power transmitting device (e.g., the wireless power transmitting device 101) may further comprise generating, by the demodulation circuit (e.g., the demodulation circuit 214), the demodulated voltage by demodulating the signal applied to the transmission coil (e.g., the transmission coil 213).

According to an embodiment, the method for operating the wireless power transmitting device (e.g., the wireless power transmitting device 101) may further comprise performing, by the demodulation circuit (e.g., the demodulation circuit 214), low-pass filtering on the demodulated voltage.

According to an embodiment, outputting the second control signal may include, when a third frequency which is a frequency of the AC power before the first control signal is outputted is smaller than the first frequency, identifying, by the controller (e.g., the controller 215), the second frequency to be larger than the first frequency, based on the first peak-to-peak value being less than or equal to a second peak-to-peak value identified while the AC power having the third frequency is applied to the transmission coil (e.g., the transmission coil 213), and identifying the second frequency to be smaller than the first frequency, based on the first peak-to-peak value being more than the second peak-to-peak value identified while the AC power having the third frequency is applied to the transmission coil (e.g., the transmission coil 213).

According to an embodiment, outputting the second control signal may include, when a third frequency which is a frequency of the AC power before the first control signal is outputted is larger than the first frequency, identifying the second frequency to be smaller than the first frequency, based on the first peak-to-peak value being less than or equal to a second peak-to-peak value identified while the AC power having the third frequency is applied to the transmission coil (e.g., the transmission coil 213), and identifying the second frequency to be larger than the first frequency, based on the first peak-to-peak value being more than the second peak-to-peak value identified while the AC power having the third frequency is applied to the transmission coil (e.g., the transmission coil 213).

According to an embodiment, outputting the second control signal may include identifying, by the controller (e.g., the controller 215), the second frequency, based on the first peak-to-peak value.

According to an embodiment, the method for operating the wireless power transmitting device (e.g., the wireless power transmitting device 101) may further comprise controlling, by the controller (e.g., the controller 215), the first peak-to-peak value so that the first peak-to-peak value is more than a predesignated second value.

According to an embodiment, outputting the second control signal may include outputting, by the controller (e.g., the controller 215), to the inverter (e.g., the inverter 218), the second control signal for controlling at the second frequency, based on detection of a trigger for a noise reduction operation.

According to an embodiment, the method for operating the wireless power transmitting device (e.g., the wireless power transmitting device 101) may further comprise controlling, by the controller (e.g., the controller 215), the DC/DC converter (e.g., the DC/DC converter 217) to adjust the driving voltage, based on outputting, to the inverter (e.g., the inverter 218), the second control signal for generating the AC power having the second frequency.

According to an embodiment, the method for operating the wireless power transmitting device (e.g., the wireless power transmitting device) may further comprise performing, by the controller (e.g., the controller 215), modulation to request a wireless power receiving device to change a load, based on the first peak-to-peak value being greater than or equal to the preset first value.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1640) including one or more instructions that are stored in a storage medium (e.g., internal memory 1636 or external memory 1638) that is readable by a machine (e.g., the wireless power transmitting device 1601). For example, a processor (e.g., the processor 1620) of the machine (e.g., the electronic device 1601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. A wireless power transmitting device comprising:
a transmission coil;
a DC/DC converter configured to output a driving voltage;
an inverter configured to output AC power to the transmission coil, using the driving voltage;
at least one controller; and
memory storing instructions that, when executed by the at least one controller, cause the wireless power transmitting device to:
output a first control signal for generating the AC power having a first frequency to the inverter, so that the inverter outputs, to the transmission coil, the AC power having the first frequency based on the first control signal,
identify voltage information of a demodulated signal generated by demodulating a signal applied to the transmission coil while the AC power having the first frequency is applied to the transmission coil, and
output, to the inverter, a second control signal for generating the AC power having a second frequency different from the first frequency, instead of the first control signal, based on a first peak-to-peak value identified in the voltage information being a preset first value or more, and
wherein the inverter outputs the AC power having the second frequency to the transmission coil based on the second control signal.

2. The wireless power transmitting device of claim 1, further comprising a demodulation circuit configured to perform demodulation on the signal applied to the transmission coil.

3. The wireless power transmitting device of claim 2, wherein the demodulation circuit is further configured to perform low-pass filtering on the demodulated signal.

4. The wireless power transmitting device of claim 1, wherein the instructions, when executed by the at least one controller, cause the wireless power transmitting device to, as at least part of outputting the second control signal:
when a third frequency which is a frequency of the AC power before the first control signal is outputted is smaller than the first frequency:
identify the second frequency to be larger than the first frequency, based on the first peak-to-peak value being less than a second peak-to-peak value identified while the AC power having the third frequency is applied to the transmission coil, and
identify the second frequency to be smaller than the first frequency, based on the first peak-to-peak value being more than the second peak-to-peak value identified while the AC power having the third frequency is applied to the transmission coil.

5. The wireless power transmitting device of claim 1, wherein the instructions, when executed by the at least one controller, cause the wireless power transmitting device to, as at least part of outputting the second control signal:
when a third frequency which is a frequency of the AC power before the first control signal is outputted is larger than the first frequency:
identify the second frequency to be smaller than the first frequency, based on the first peak-to-peak value being less than a second peak-to-peak value identified while the AC power having the third frequency is applied to the transmission coil, and
identify the second frequency to be larger than the first frequency, based on the first peak-to-peak value being more than the second peak-to-peak value identified while the AC power having the third frequency is applied to the transmission coil.

6. The wireless power transmitting device of claim 1, wherein the instructions, when executed by the at least one controller, cause the wireless power transmitting device to, as at least part of outputting the second control signal:
identify the second frequency based on the first peak-to-peak value.

7. The wireless power transmitting device of claim 1, wherein the instructions, when executed by the at least one controller, cause the wireless power transmitting device to control the first peak-to-peak value so that the first peak-to-peak value is more than a predesignated second value.

8. The wireless power transmitting device of claim 1, wherein the instructions, when executed by the at least one controller, cause the wireless power transmitting device to, as at least part of outputting the second control signal:
output, to the inverter, the second control signal for generating the AC power having the second frequency, based on detection of a trigger for a noise reduction operation.

9. The wireless power transmitting device of claim 1, wherein the instructions, when executed by the at least one controller, cause the wireless power transmitting device to control the DC/DC converter to adjust the driving voltage based on outputting, to the inverter, the second control signal for generating the AC power having the second frequency.

10. The wireless power transmitting device of claim 1, wherein the instructions, when executed by the at least one controller, cause the wireless power transmitting device to perform modulation to request a wireless power receiving device to change a load, based on the first peak-to-peak value being greater than the preset first value.

11. A method for operating a wireless power transmitting device including a transmission coil, a DC/DC converter configured to output a driving voltage, and an inverter configured to output AC power to the transmission coil using the driving voltage, the method comprising:
outputting a first control signal for generating the AC power having a first frequency to the inverter, so that the inverter outputs, to the transmission coil, the AC power having the first frequency based on the first control signal;
identifying voltage information of a demodulated signal generated by demodulating a signal applied to the transmission coil while the AC power having the first frequency is applied to the transmission coil; and
outputting to the inverter, a second control signal for generating the AC power having a second frequency different from the first frequency, instead of the first control signal, based on a first peak-to-peak value identified in the voltage information being a preset first value or more,
wherein the inverter outputs the AC power having the second frequency to the transmission coil based on the second control signal.

12. The method of claim 11, wherein the wireless power transmitting device further comprises a demodulation circuit configured to perform demodulation on the signal, and
wherein the method for operating the wireless power transmitting device further comprises generating, by the demodulation signal, the demodulated signal by demodulating the signal applied to the transmission coil.

13. The method of claim 12, further comprising performing, by the demodulation circuit, low-pass filtering on the demodulated signal.

14. The method of claim 11, wherein outputting the second control signal further comprises:
when a third frequency which is a frequency of the AC power before the first control signal is outputted is smaller than the first frequency:
identifying the second frequency to be larger than the first frequency, based on the first peak-to-peak value being less than a second peak-to-peak value identified while the AC power having the third frequency is applied to the transmission coil, and
identifying the second frequency smaller to be than the first frequency, based on the first peak-to-peak value being more than the second peak-to-peak value identified while the AC power having the third frequency is applied to the transmission coil.

15. The method of claim 11, wherein outputting the second control signal further comprises:
when a third frequency which is a frequency of the AC power before the first control signal is outputted is larger than the first frequency:
identifying the second frequency to be smaller than the first frequency, based on the first peak-to-peak value being less than a second peak-to-peak value identified while the AC power having the third frequency is applied to the transmission coil, and
identifying the second frequency to be larger than the first frequency, based on the first peak-to-peak value being more than the second peak-to-peak value identified while the AC power having the third frequency is applied to the transmission coil.

16. The method of claim 11, wherein outputting the second control signal further comprises:
identifying the second frequency based on the first peak-to-peak value.

17. The method of claim 11, further comprising controlling the first peak-to-peak value so that the first peak-to-peak value is more than a predesignated second value.

18. The method of claim 11, wherein outputting the second control signal further comprises:
outputting to the inverter, the second control signal for controlling at the second frequency, based on detection of a trigger for a noise reduction operation.

19. The method of claim 11, further comprising controlling the DC/DC converter to adjust the driving voltage, based on outputting, to the inverter, the second control signal for generating the AC power having the second frequency.

20. The method of claim 11, further comprising performing modulation to request a wireless power receiving device to change a load, based on the first peak-to-peak value being greater than the preset first value.

* * * * *